United States Patent
Loveless et al.

(10) Patent No.: US 7,317,177 B2
(45) Date of Patent: Jan. 8, 2008

(54) ELECTRIC INDUCTION HEAT TREATMENT OF AN END OF TUBULAR MATERIAL

(75) Inventors: Don L. Loveless, Sterling Heights, MI (US); Peter A. Ross, Brighton, MI (US); Valery I. Rudnev, Rochester Hill, MI (US); John Paul Lang, Canton, MI (US)

(73) Assignee: Inductoheat, Inc., Madison Heights, MI (US)

( * ) Notice: Subject to any disclaimer, the term of this patent is extended or adjusted under 35 U.S.C. 154(b) by 0 days.

(21) Appl. No.: 11/691,751

(22) Filed: Mar. 27, 2007

(65) Prior Publication Data

US 2007/0246459 A1    Oct. 25, 2007

Related U.S. Application Data

(60) Provisional application No. 60/794,492, filed on Apr. 24, 2006.

(51) Int. Cl.
*H05B 6/10* (2006.01)
*H05B 6/40* (2006.01)

(52) U.S. Cl. .............. 219/643; 219/670; 148/570; 266/129

(58) Field of Classification Search ........ 219/643–644, 219/670, 634, 672–677; 148/570–571; 266/129
See application file for complete search history.

(56) References Cited

U.S. PATENT DOCUMENTS 2,948,797 A * 8/1960 Kurtz et al. ............... 219/644

| | | |
|---|---|---|
| 4,561,489 A | 12/1985 | Dantzig et al. |
| 4,776,980 A | 10/1988 | Ruffini |
| 4,806,863 A | 2/1989 | White |
| 5,550,353 A | 8/1996 | Peysakhovich et al. |
| 5,821,504 A | 10/1998 | Sprenger et al. |
| 5,821,638 A | 10/1998 | Boys et al. |

(Continued)

FOREIGN PATENT DOCUMENTS

| | | | |
|---|---|---|---|
| EP | 0653899 A2 | | 5/1995 |
| JP | 2001-6861 | * | 1/2001 |

OTHER PUBLICATIONS

"A fresh look at induction heating of tubular products: Part 1", Valery I. Rudnev, Heat Treating Progress, May/Jun. 2004, p. 17-19, ASM International, Materials Park, OHIO.

"A fresh look at induction heating of tubular products: Part 2", Valery I. Rudnev, Heat Treating Progress, Jul./Aug. 2004, p. 23-25, ASM International, Materials Park, OHIO.

"An objective assessment of magnetic flux concentrators", Valery I. Rudnev, Heat Treating Progress, Heat Treating Progress Nov./Dec. 2004, p. 19-23, ASM International, Materials Park, OHIO.

*Primary Examiner*—Philip H. Leung
(74) *Attorney, Agent, or Firm*—Philip O. Post

(57) ABSTRACT

A magnetic flux concentrator is used to control the end heating of a tubular material in an electric induction heat treatment process. The magnetic flux concentrator may consist of fixed elements, or a combination of fixed and moveable elements to accommodate end heating of tubular materials having different dimensions or material properties.

19 Claims, 19 Drawing Sheets

U.S. PATENT DOCUMENTS

| | | |
|---|---|---|
| 5,828,940 A | 10/1998 | Learman |
| 5,844,213 A | 12/1998 | Peysakhovich et al. |
| 6,166,360 A | 12/2000 | Ruffini, Sr. et al. |
| 6,555,801 B1 | 4/2003 | LeMieux et al. |
| 6,576,877 B2 | 6/2003 | Dabelstein et al. |
| 6,730,893 B1 | 5/2004 | Runde |
| 6,781,100 B2 | 8/2004 | Pilavdzic et al. |
| 6,815,649 B2 | 11/2004 | Beer |
| 7,034,263 B2 | 4/2006 | Kagan |
| 7,041,944 B2 | 5/2006 | Pilavdzic et al. |
| 2002/0121512 A1* | 9/2002 | Thrope et al. .............. 219/645 |
| 2006/0124632 A1 | 6/2006 | Stuehr et al. |

* cited by examiner

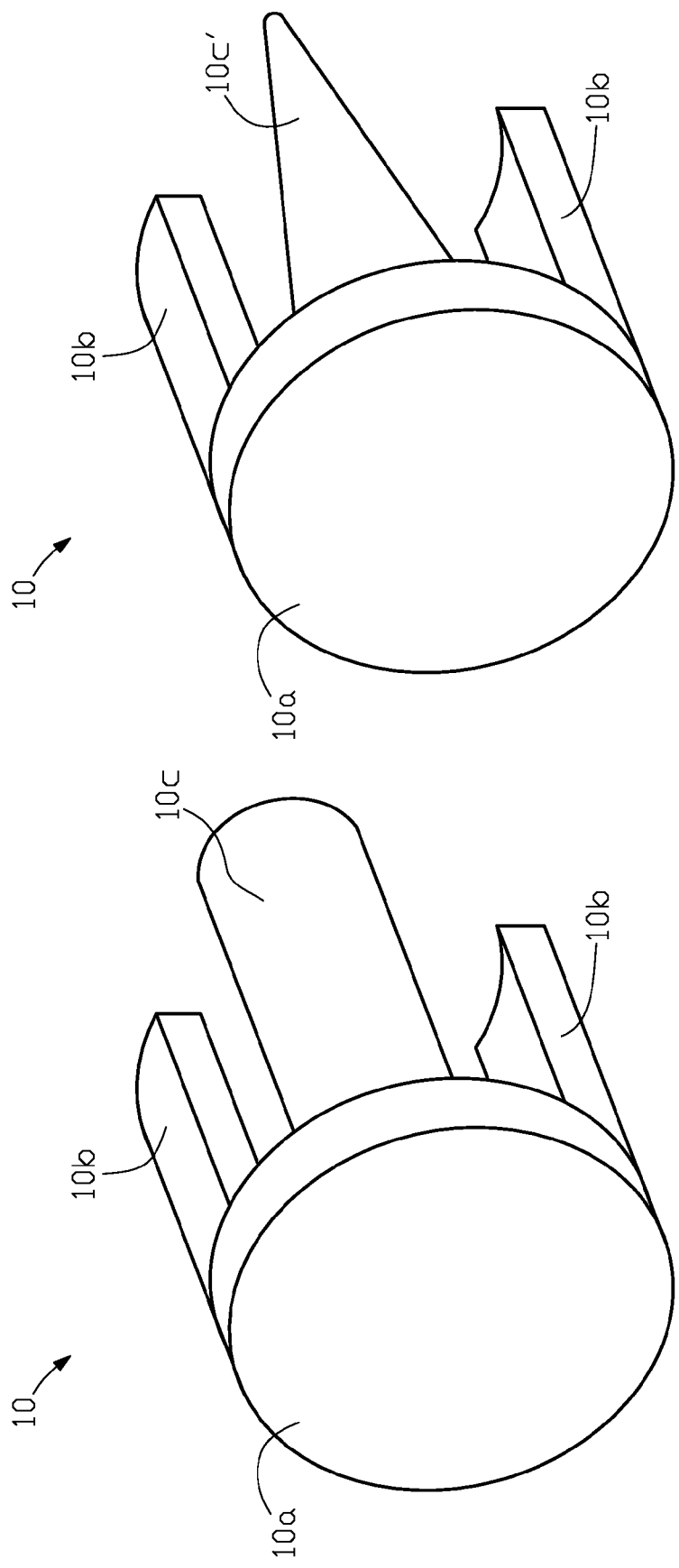

ELECTRIC INDUCTION HEAT TREATMENT OF AN END OF TUBULAR MATERIAL

CROSS REFERENCE TO RELATED APPLICATIONS

This application claims the benefit of U.S. Provisional Application No. 60/794,492, filed Apr. 24, 2006, hereby incorporated by reference in its entirety.

FIELD OF THE INVENTION

The present invention relates to electric induction heat treatment of the end regions of a tubular material.

BACKGROUND OF THE INVENTION

Electric induction heating can be used to heat treat tubular materials such as metal tubes and pipes. Typically the tubular material is held in place within a solenoidal induction coil as illustrated in FIG. 1. Tube 90 is placed within solenoidal coil 30. When suitable ac power is applied to the coil, the tube is inductively heated by magnetic coupling with the longitudinal flux field established by the flow of ac current through the coil. The heat treatment may be, for example, annealing, normalizing, stress relieving, coating, drying, hardening or tempering of the end of the tubular material. In other applications induction end heating of tubular products can be used for heating ends prior to metal forming operations. Some applications require uniform heating of a specific length of an end portion of the tubular material.

As shown in FIG. 1, when uniform end heat treatment is desired, the tubular material is situated in the coil so that the coil "overhangs" the end of the material. Generally the longitudinal axis, X, of the coil and tubular material are coincident and the solenoidal coil is shaped to coincide with the shape of the tubular material. The overhang distance, $X_{oh}$, controls the shape of the flux field established at an axial end of the coil beyond the end of the tubular material so that the flux field intensity is established within the end of the material to uniformly heat it to the required length. The proper overhang distance is affected by a number of parameters, including the outside diameter of the tubular material, the material's thickness, physical and metallurgical properties, and the frequency of the ac power applied to the coil. Therefore different coils are required for tubular materials of different sizes, or for heat treating the same tubular material to different end lengths. Compare, for example, FIG. 2(a), FIG. 2(b) and FIG. 2(c) wherein the same induction coil 30 and overhang distance, $X_{oh}$, is used to induction heat an end of: (1) tubular material 90a having an outside diameter (OD) equal to $OD_1$ and thickness $t_1$; (2) tubular material 90b having an outside diameter $OD_2$, which is smaller than $OD_1$, and thickness $t_1$; and (3) tubular material 90c having an outside diameter $OD_2$ and thickness $t_2$, which is greater than $t_1$, respectively. As illustrated by the graphs in FIG. 2(d), for tubular material 90a in FIG. 2(a), required end heated length 92, thermal transition zone 94 and cold zone 96 all vary. The term "required end heated length" typically refers to a uniform heating temperature distribution over the required end heated length. Since heat cannot be induced in an end length of the material with an abrupt transition to a "no heat" (or cold) end zone, there is an end length with a thermal transition zone 94 wherein the heat decreases gradually towards the cold zone 96 due to a "soaking" effect whereby heat induced in the required end heated length conducts from the required end heated length 92 towards the cold zone 96. Control of both the required end heated length and the length of the thermal transition zone is important in some heat treatment processes. For tubular materials 90b and 90c in FIG. 2(b) and FIG. 2(c), respectively, due to the electromagnetic end effect that exists at the coil end, the materials are not sufficiently heated along the full length of required end heated length 92' and 92", respectively. At the end of the tube there is under-heated zone 91. When it is necessary to heat a tubular material with a smaller OD using a coil designed for a larger OD, the end of the tube will be under-heated (zone 91) due to the reduction of heat sources caused by the electromagnetic end effect. If the tubular material is of the same shape, but fabricated from a material having different physical or metallurgical properties, for example a metal that has higher electrical resistivity, then the end of the tube will also be under-heated due to the reduction of heat sources caused by the electromagnetic end effect.

Alternatively a single coil with multiple taps of ac power connections along the length of the coil would allow some additional flexibility for uniform tubular end heating of tubular materials of different dimensions or metallurgical composition. By using appropriate taps for ac power connection, the energized length of the coil can be changed to adjust the overhang distance. Unfortunately, there is a limitation in using coil overhang for obtaining a uniform end heating. This limitation is particularly noticeable when heating magnetic metals below Curie temperature. After reaching certain values, a further increase in coil overhang will not compensate for the lack of heat sources caused by the electromagnetic end effect. In addition, large coil overhangs result in a reduction in coil efficiency and coil power factor. Both factors negatively affect cost effectiveness and flexibility of an induction system due to higher energy losses and the necessity to use special means for coil power factor correction.

One object of the present invention is to improve the end temperature heating uniformity of various types of tubular materials in an electric induction heat treatment process wherein at least one end region of the tubular material is inserted into a solenoidal induction coil. Another object of the present invention is improving flexibility of the induction heating system to permit required (for example, uniform) heating of tubular products of different geometries and materials using the same induction heater.

BRIEF SUMMARY OF THE INVENTION

In one aspect the present invention is an apparatus and method of electric induction heating of the end regions of a tubular material. At least one end region of the tubular material is inserted into an induction coil that is supplied with ac power to establish an ac magnetic field that couples with the tubular material to inductively heat it. In some examples of the invention, the end of tube flux concentrator comprises a base, a plurality of peripheral poles extending around the peripheral regions of a tube-facing side of the base, and at least one central pole extending generally from the central region of the tube-facing side of the base. The longitudinal axis of the flux concentrator passes through, and is generally perpendicular to, the tube-facing side of the base. The at least one central pole protrudes at least partially into the overhang region of the induction coil that is adjacent to the end of the tube, and the plurality of peripheral poles extend at least partially around the exterior of the end of the induction coil. In some examples of the invention, the flux concentrator is moveable to selectively control: the distance of protrusion of the flux concentrator into the induction coil, or into the end of the tube in the induction coil; the extension distance of the plurality of peripheral poles around the exterior of the end of the induction coil; and/or the distance of the base from the end of the induction coil. In other examples of the invention, the at least one central pole is moveable relative to the base and the plurality of peripheral poles in the direction of the longitudinal axis of the flux concentrator. In other examples of the invention, the flux concentrator can include a leg located adjacent to the extended end of at least one of the plurality of peripheral poles. The leg is optionally moveable in a direction generally parallel to the length of the at least one of the plurality of peripheral poles. In other examples of the invention, the base does not protrude into the end of the induction coil; alternatively a base offset element, positioned between the tube-facing surface of the base and the end of the tubular material, can protrude into the induction coil; in either of these alternative arrangements, the end of the tube can be placed against the surface of the base, or the base offset element, respectively, or spaced apart from the respective surface. In other examples of the invention, the flux concentrator may be an annulus, or an adjustable iris diaphragm, that can be selectively aligned with the longitudinal axis of the end of the tubular material in the induction coil.

In another aspect the present invention is an apparatus and method of electric induction heating of the end regions of a tubular material. At least one end of the tubular material is inserted into an induction coil that is supplied with ac power to establish an ac magnetic field that couples with the tubular material to inductively heat it. In some examples of the invention, an end of tube flux concentrator comprises a base, central pole and a plurality of peripheral poles. The base is formed from a plurality of base legs radially distributed about the longitudinal axis of the flux concentrator. The central pole comprises a plurality of wedge elements, each of which generally extends perpendicularly from the tube-facing side of the converging end of each of the plurality of base legs. Each of the polarity of peripheral poles generally extends perpendicularly from the tube-facing side of the diverging end of each of the plurality of base leg elements to an extended end. The longitudinal axis of the flux concentrator passes through and is generally perpendicular to the plane established by the plurality of base legs. In some examples of the invention, the central pole protrudes at least into the overhang region of the induction coil that is adjacent to the end of the tube, and the plurality of peripheral poles extend at least partially around the exterior of the end of the induction coil. In some examples of the invention, the flux concentrator is moveable to selectively control: the distance of protrusion of the flux concentrator into the induction coil, or into the end of the tube in the induction coil; the extension distance of the plurality of peripheral poles around the exterior of the end of the induction coil; and/or the distance of the base from the end of the induction coil. In other examples of the invention, the combination of the base and central pole is moveable relative to the peripheral poles in the direction of the longitudinal axis of the flux concentrator. In other examples of the invention, the flux concentrator can include a leg located adjacent to the extended end of at least one of the plurality of peripheral poles. The leg is optionally moveable in a direction generally parallel to the longitudinal axis of the flux concentrator. In other examples of the invention, the base, which comprises the plurality of base legs, and the central pole, which comprises the plurality of wedge elements, can be radially adjusted relative to the longitudinal axis of the flux concentrator.

The above and other aspects of the invention are further set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims:

FIG. 8(a) is a perspective view of the magnetic flux concentrator illustrated in FIG. 7(a).

FIG. 8(b) is a perspective view of a magnetic flux concentrator with a conical central section used for electric induction heat treatment of an end of a tubular material of the present invention.

DETAILED DESCRIPTION OF THE INVENTION

Figure 1:
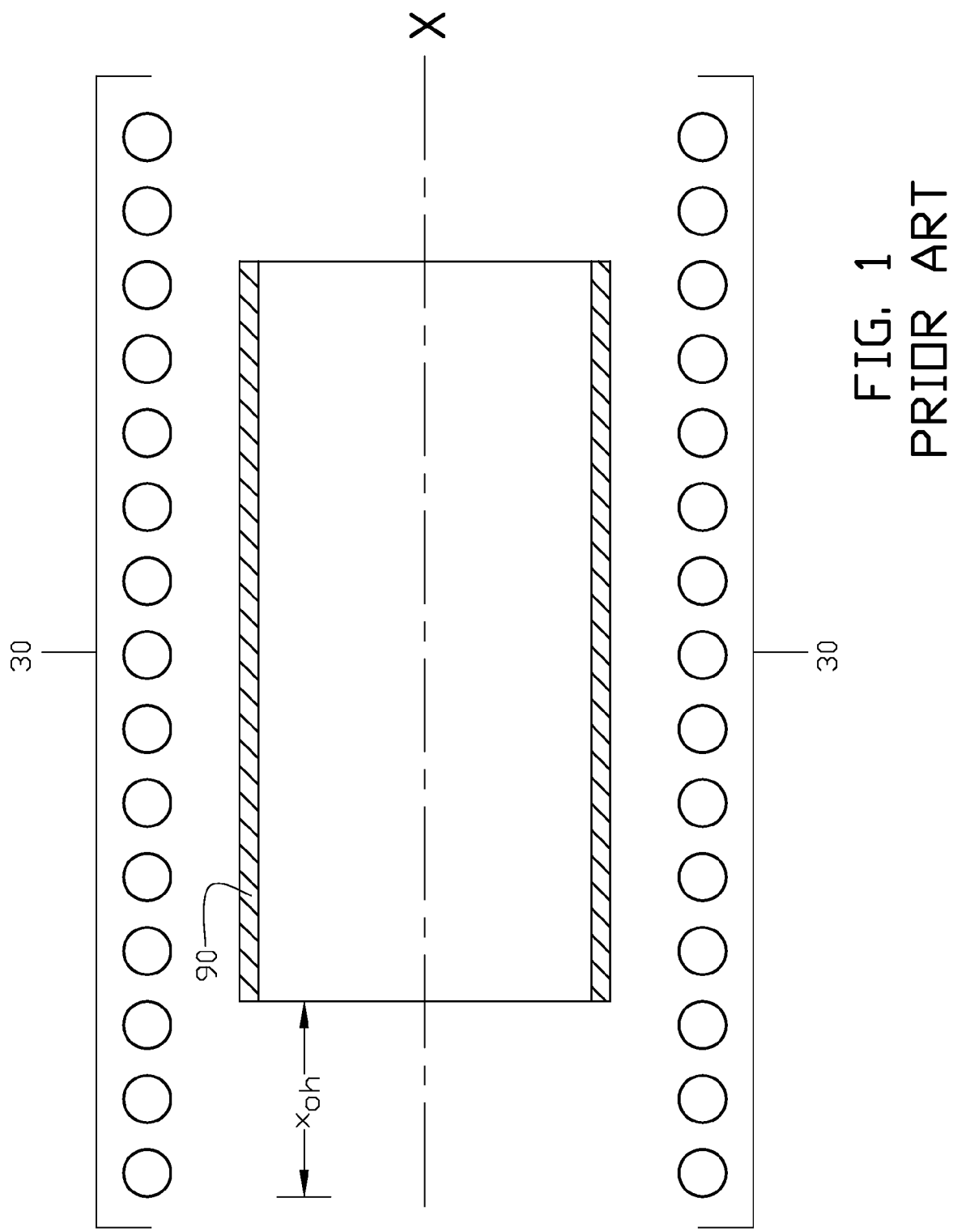
FIG. 1 illustrates in a cross sectional diagram a prior art apparatus for electric induction heat treatment of a tubular material.
Figure 2B:
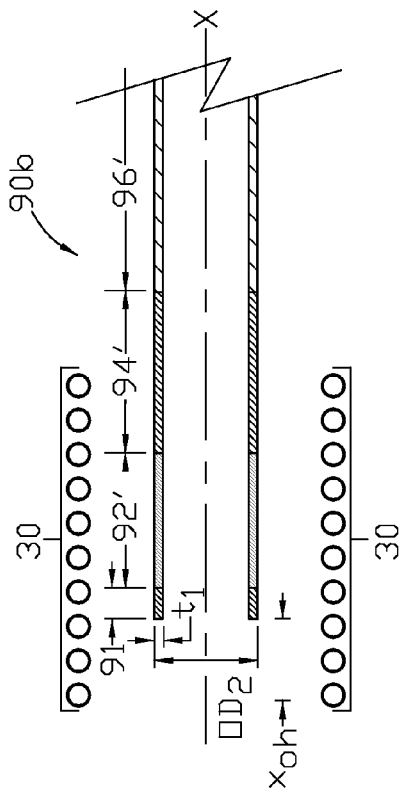
FIG. 2(a), FIG. 2(b) and FIG. 2(c) illustrate in cross sectional diagrams, prior art apparatus for electric induction heat treatment of tubular materials having different dimensions.
Figure 2D:
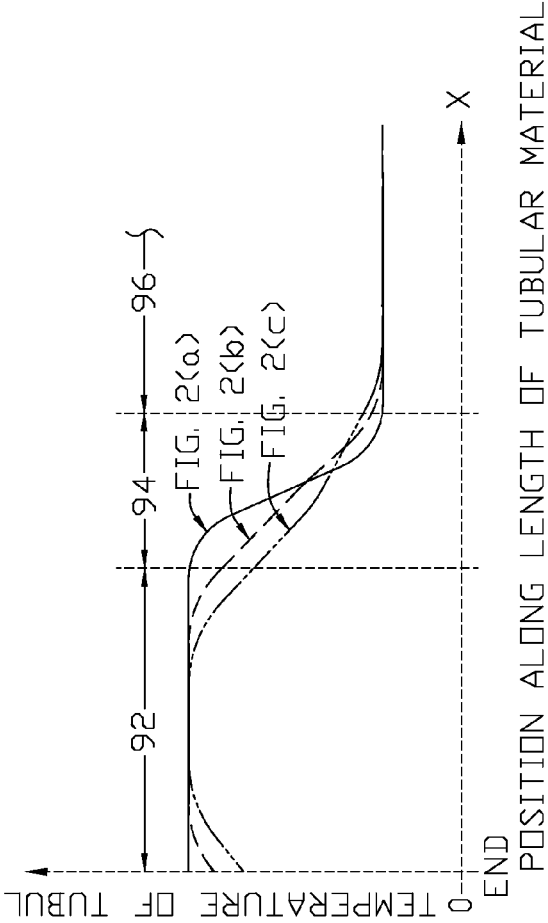
FIG. 2(d) graphically compares induced end heating of tubular materials shown in FIG. 2(a), FIG. 2(b) and FIG. 2(c).
Figure 2A:
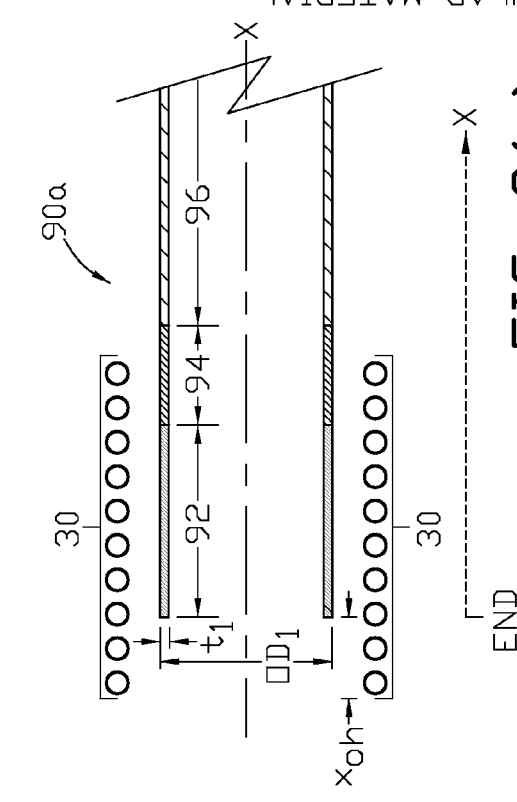
Figure 2C:
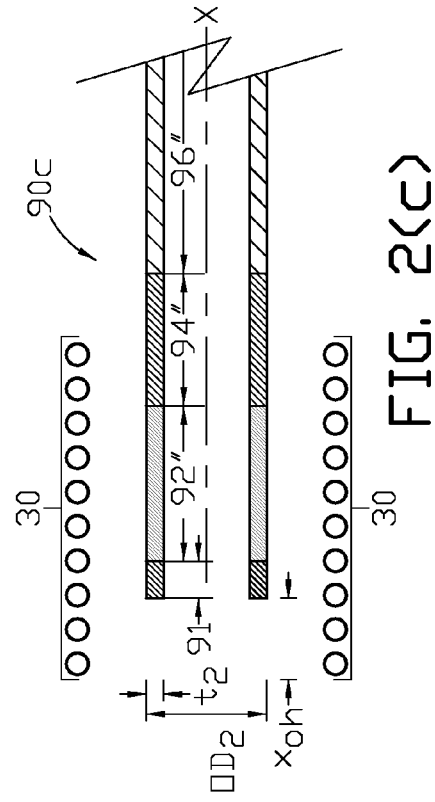
Figure 3:
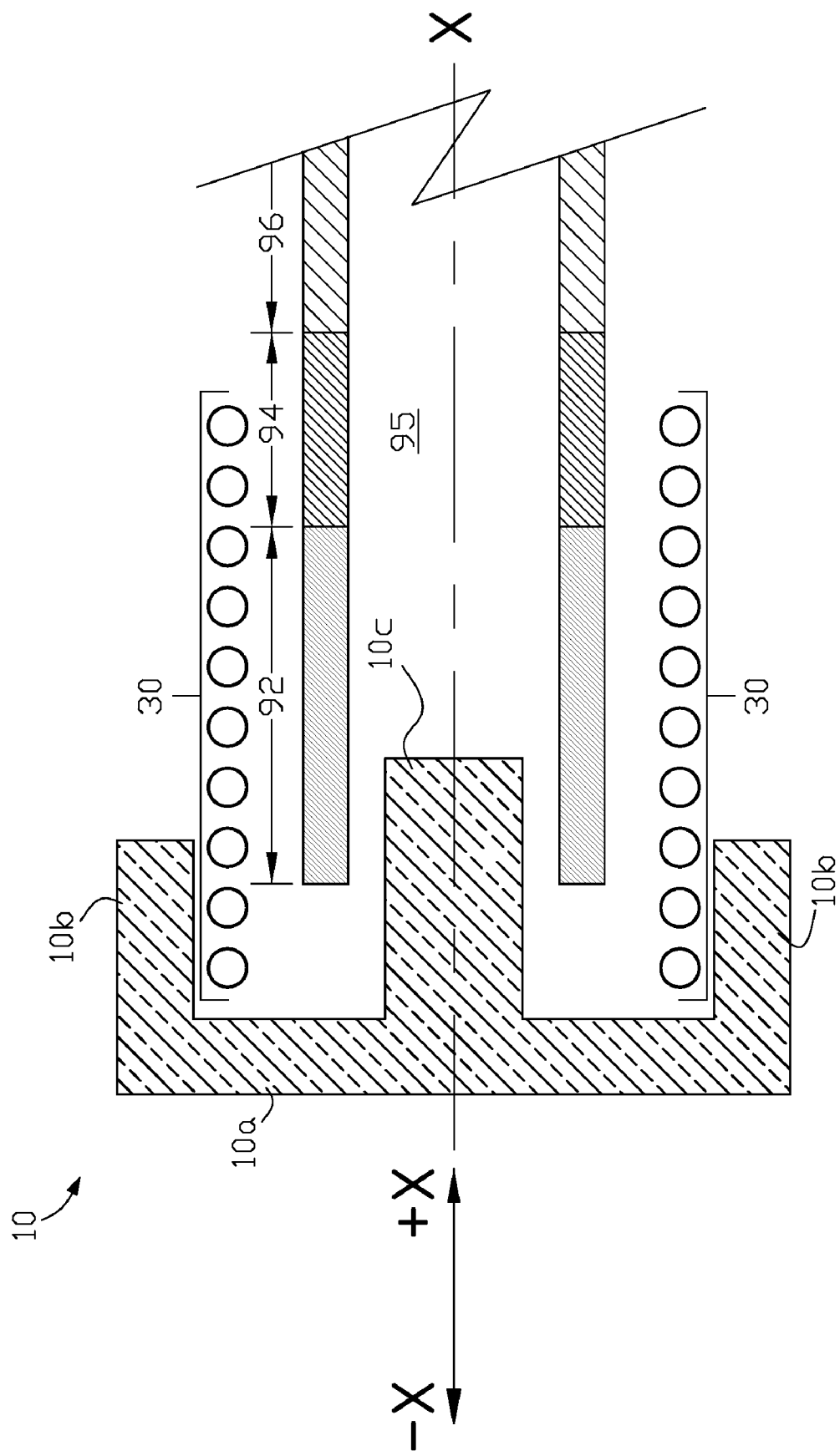
FIG. 3 illustrates in a cross sectional diagram one example of the electric induction heat treatment of an end of a tubular material of the present invention.

One non-limiting example of the electric induction heat treatment apparatus for end heating of a tubular material of the present invention is illustrated in FIG. 3. End of tube magnetic flux concentrator 10 comprises base 10a having a plurality of peripheral poles 10b and a central pole 10c extending from a surface of the base generally in the axial direction of tubular material 95, which is inserted into induction coil 30 for induction heat treatment when ac power is applied to the coil. The central pole is located interior to the inside diameter of the tubular material. The peripheral poles are located around the peripheral regions of the base and are external to the exterior surface of the tubular material and the induction coil as shown in the FIG. 3. Concentrator 10 can be moved either in the +X or −X direction to accommodate tubular materials of different dimensions, or to affect the end lengths of heat treatment. Changing the position of concentrator 10 relative to the fixed position of coil 30 and tubular material 95 results in controlled end heating of tubular material of different sizes, lengths or metallurgical properties within the same coil.

Figure 4A:
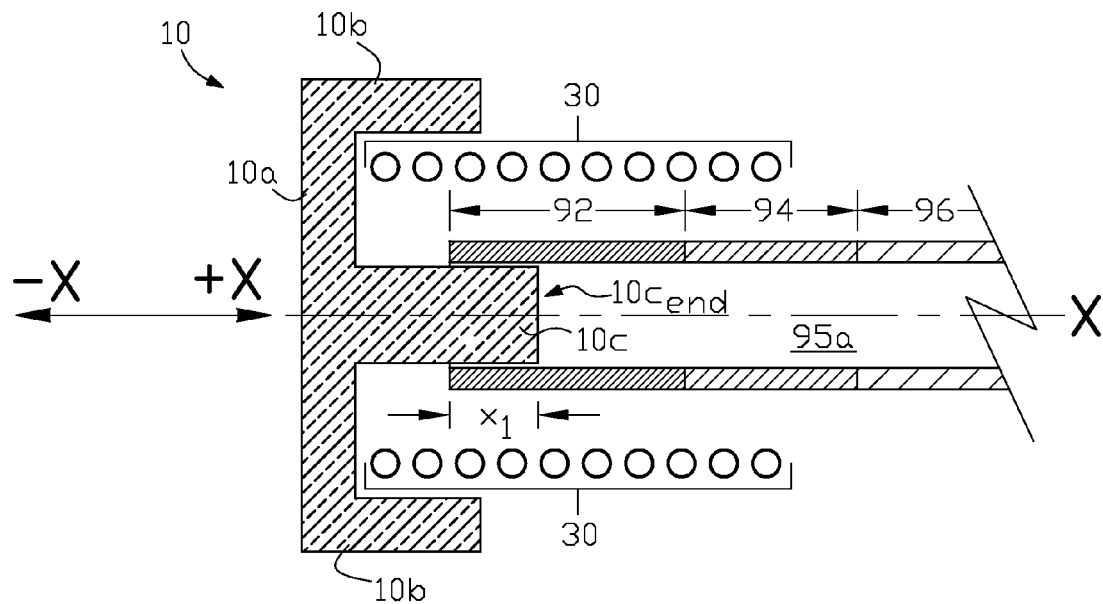
FIG. 4(a) and FIG. 4(b) illustrate in cross sectional diagrams another example of the electric induction heat treatment of an end of a tubular material of the present invention.
Figure 4B:
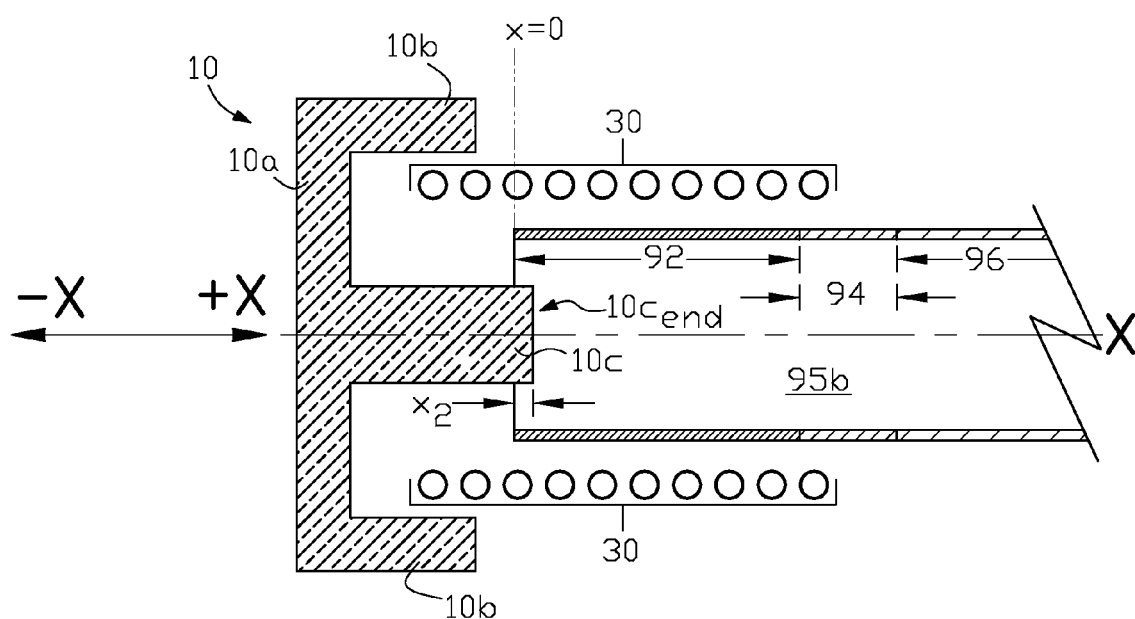

For example, FIG. 4(a) and FIG. 4(b) illustrate the use of the same magnetic flux concentrator 10 to heat two tubular materials having different inside diameters and wall thicknesses, namely tubular material 95a in FIG. 4(a), which has a smaller inside diameter and greater thickness than tubular element 95b in FIG. 4(b). In FIG. 4(a) the end of central pole 10c of concentrator 10 is positioned along the X-axis in the interior opening of the tubular element 95a for a distance $x_1$ to achieve required end heated length 92; whereas in FIG. 4(b) central pole 10c of concentrator 10 is positioned along the X-axis into the interior opening of tubular element 95b for a distance $x_2$ to achieve required end heated length 92. Depending upon specific requirements of an application, the distance $x_2$ could be negative (X-position of the end of the tubular material establishing x=0 as indicated in FIG. 4(b)); that is, the end $10c_{end}$ of the central pole 10c can be located at a certain distance outside of the tube in the coil overhang region.

Figure 5A:
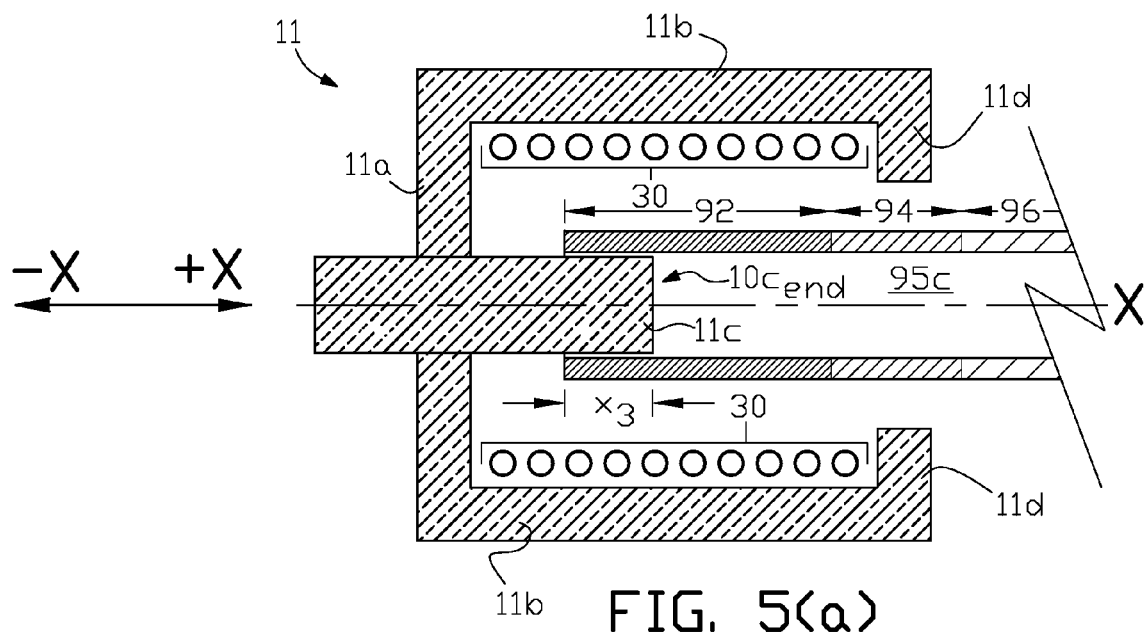
FIG. 5(a) and FIG. 5(b) illustrate in cross sectional diagrams another example of the electric induction heat treatment of an end of a tubular material of the present invention.
Figure 5B:
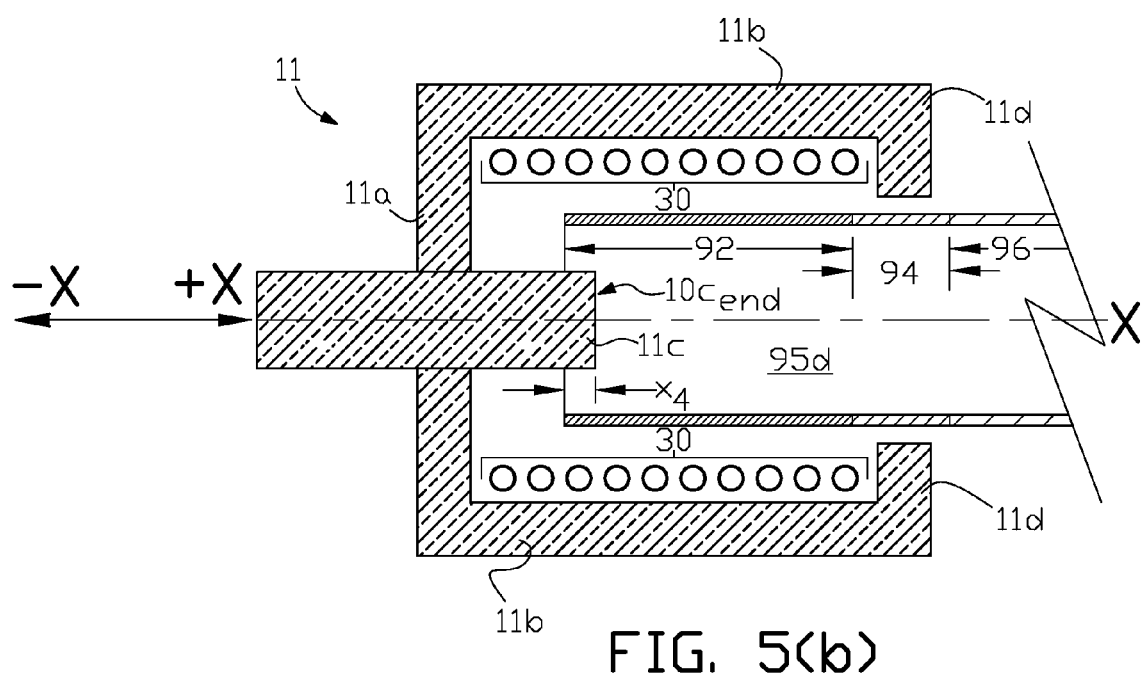

FIG. 5(a) and FIG. 5(b) illustrate another non-limiting example of the present invention. In these examples of the invention, concentrator 11 comprises base element 11a, a plurality of peripheral poles 11b and central pole 11c. Additionally the base and peripheral poles are fixed in position, along with solenoidal coil 30 and tubular material 95c or 95d. The base and peripheral poles surround at least a part of the longitudinal length of coil 30. Optionally leg element 11d may be provided for one or more of the peripheral poles. In this example, leg element 11d is located at the extended end of each peripheral pole and faces the exterior of the tubular material. Central pole 11c can move in the +X and −X directions along the X-axis. As illustrated in FIG. 5(a) the end of central pole 11c is positioned along the X-axis into the interior opening of tubular element 95c for a distance of $X_3$ to achieve required end heated length 92; whereas in FIG. 5(b) central pole 11c of concentrator 11 is positioned along the X-axis into the interior opening of tubular element 95d for a distance $X_4$ to achieve required end heated length 92. Depending upon specific requirements of an application, the distance $X_4$ could be negative; that is, the end $11c_{end}$ of the central pole 11c can be located at a certain distance outside of the tube in the coil overhang region.

Figure 6A:
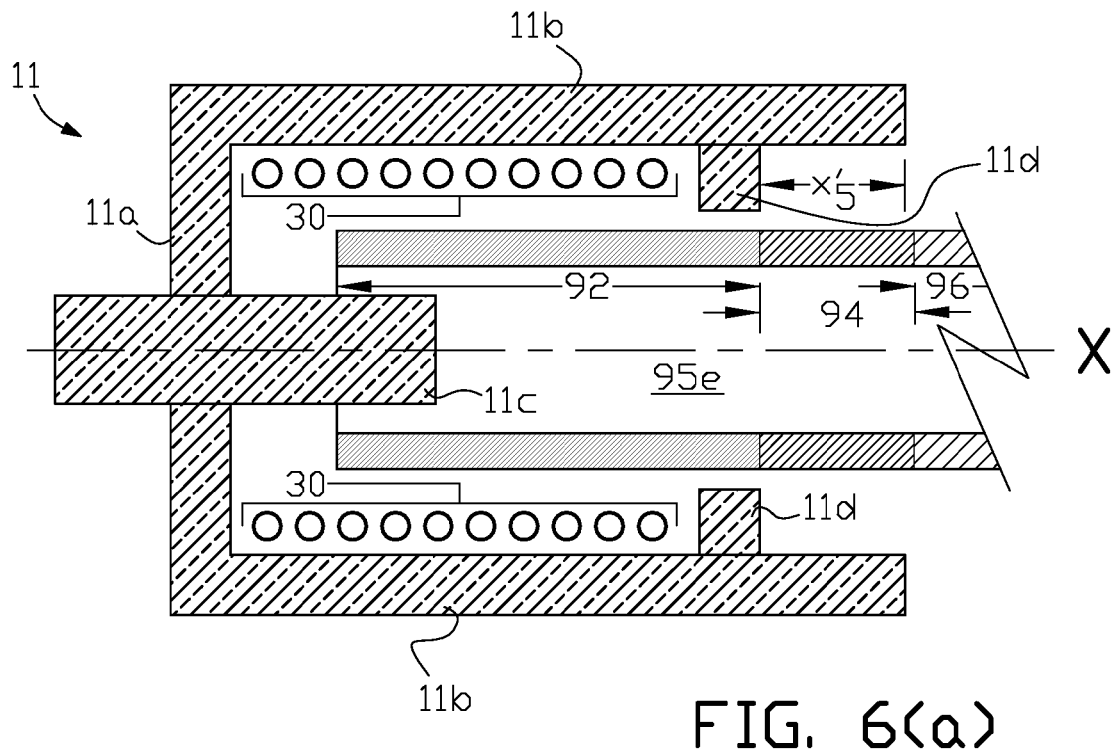
FIG. 6(a) and FIG. 6(b) illustrate in cross sectional diagrams another example of the electric induction heat treatment of an end of a tubular material of the present invention.
Figure 6B:
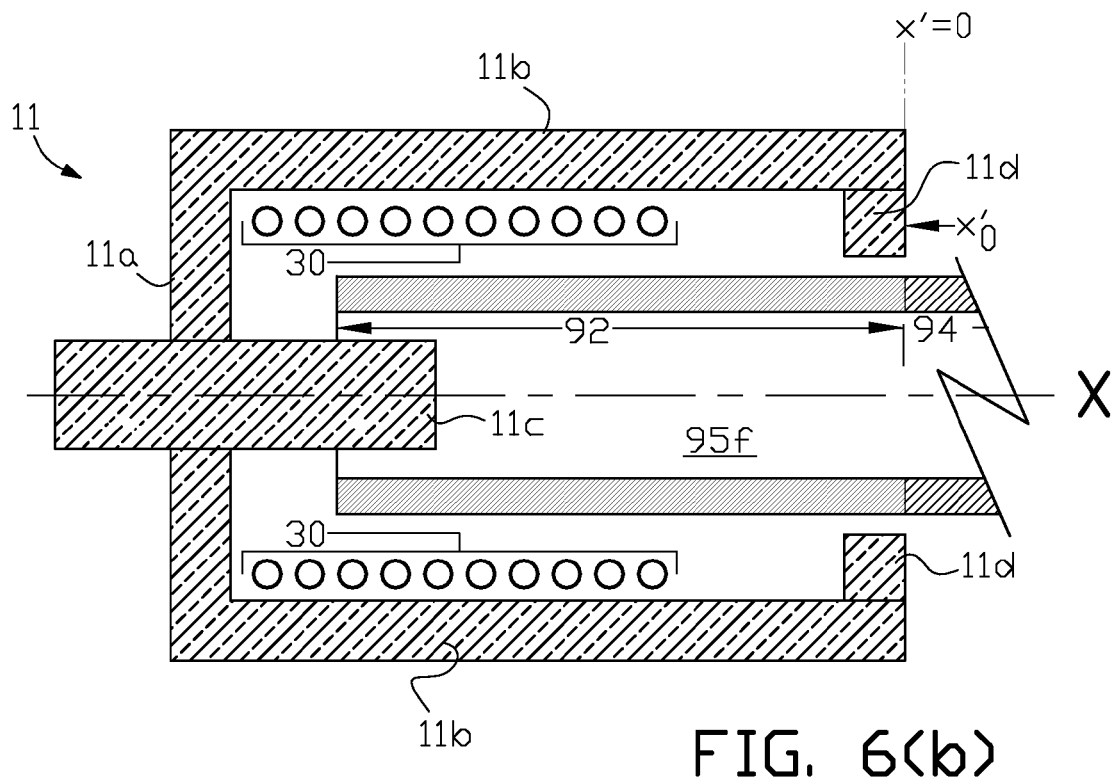

FIG. 6(a) and FIG. 6(b) illustrate another non-limiting example of the present invention. These examples are similar to those in FIG. 5(a) and FIG. 5(b) except that leg element 11d is moveable in a direction generally parallel to the length of the adjacent peripheral pole element. This example of the present invention is particularly useful in controlling the thermal transition length 94. As illustrated in FIG. 6(a), leg element 11d is positioned along the peripheral pole element at a distance of $x'_5$ from the extended end of the peripheral pole element to achieve required end heated length 92; whereas in FIG. 6(b), leg element 11d is positioned at $x'_0$, which is defined as the end of the peripheral pole element. In other examples of the invention, a combination of movement of leg element 11d and central pole 11c, as described above, may be used.

Figure 7C:
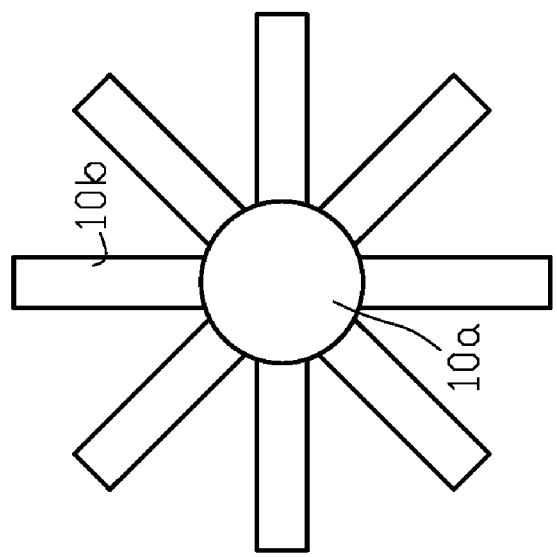
FIG. 7(a), FIG. 7(b) and FIG. 7(c) illustrate in an end elevational view alternative examples of the magnetic flux concentrator illustrated in FIG. 3 with varying number of peripheral poles.
Figure 7B:
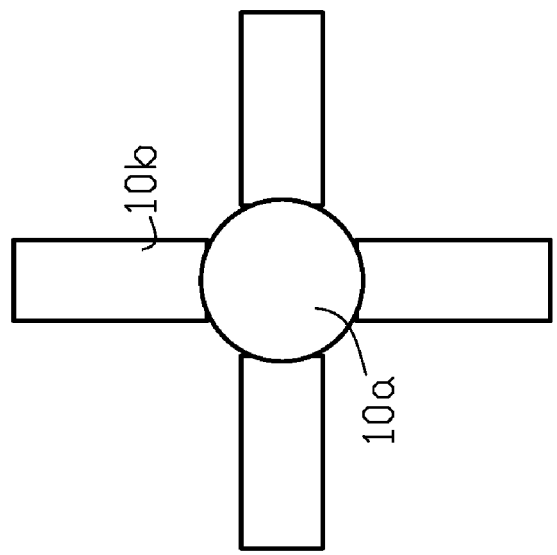
Figure 7A:
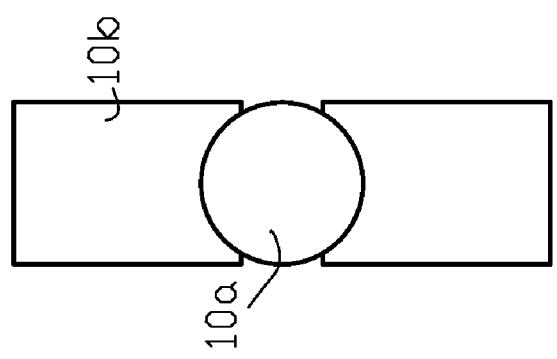

In other non-limiting examples of the invention, any of the flux concentrators may be an "E"-shaped concentrator comprising a pair of peripheral poles as illustrated in FIG. 7(a) and FIG. 8(a) or FIG. 8(b). In other examples of the invention, the number of peripheral poles may be increased, for example, to four or six, as shown in FIG. 7(b) and FIG. 7(c), respectively, or any other number of poles. Although the peripheral poles are illustrated as curved rectangular elements in FIG. 8(a) and FIG. 8(b), they may be of different shapes, as long as they establish a magnetic field around the end of the tubular material inside the induction coil. As a limitation, the number of poles may increase to the point that the peripheral poles generate into a solid cylindrical peripheral pole structure around the base element of the concentrator. Although the base elements of the above flux concentrators are illustrated as circular disks in FIG. 7(a) through FIG. 7(c), FIG. 8(a) and FIG. 8(b), they may be of other shapes depending upon the particular tubular material to be inductively heat treated. Although the central pole is illustrated as a single cylindrical element in some of the above examples of the invention, the central pole may be of different shapes, for example, conical as shown in FIG. 8(b), and may consist of multiple central pole elements that establish a composite magnetic field around the end of the tubular material.

Figure 9A:
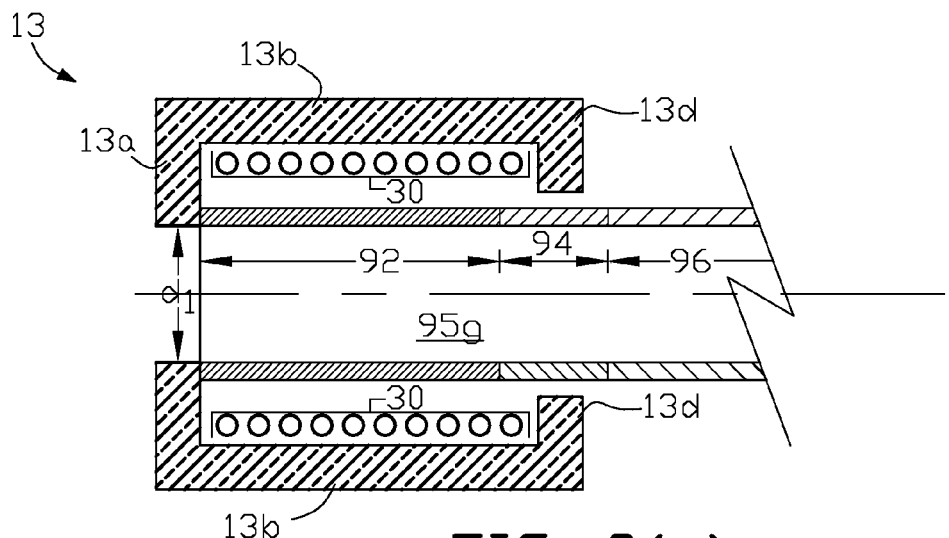
FIG. 9(a) and FIG. 9(b) illustrate in cross sectional diagrams another example of the electric induction heat treatment of an end of a tubular material of the present invention.
Figure 9B:
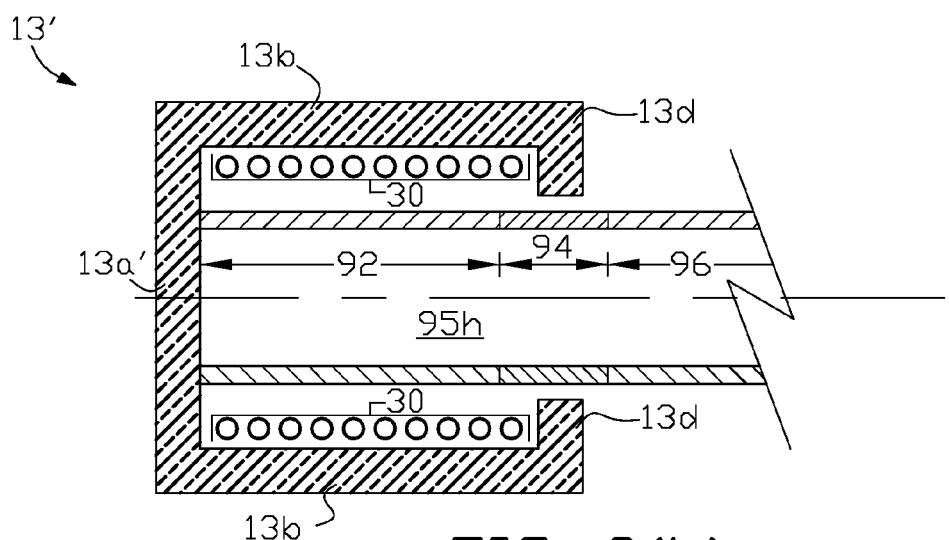

FIG. 9(a) and FIG. 9(b) illustrate examples of the present invention that are particularly suited for use with low resistivity tubular material (for example, copper, brass or aluminum compositions). In the example of FIG. 9(a), a central pole element is not used. Concentrator 13 comprises base element 13a, and a plurality of peripheral poles 13b, each of which has an optional leg element 13d, located adjacent to its extended end. Base element 13a is an annulus in this non-limiting example of the invention. Alternatively base element 13a may be an adjustable iris diaphragm with an adjustable opening or aperture as illustrated in FIG. 11(b). The base, peripheral poles and legs are fixed in position, along with solenoidal coil 30 and tubular material 95g. The base, peripheral poles and legs surround at least a part of the longitudinal length of coil 30. The end of tubular material 95g is flush with the facing surface of base element 13a, and consequently, there is no overhang distance. Although FIG. 9(a) and FIG. 9(b) show the end of tubular material 95g and 95h, respectively, flush with base element 13a and 13a', respectively, of the flux concentrator, in other examples of the invention, the end of the tube may be offset from the surface of the base, and the diameter, $d_1$, of the annulus hole may be smaller that the inner diameter of the tubular material inside the induction coil. The arrangement shown in FIG. 9(b) is similar to the arrangement in FIG. 9(a) except that base element 13a' of concentrator 13' is a solid cylindrical disk.

Figure 10A:
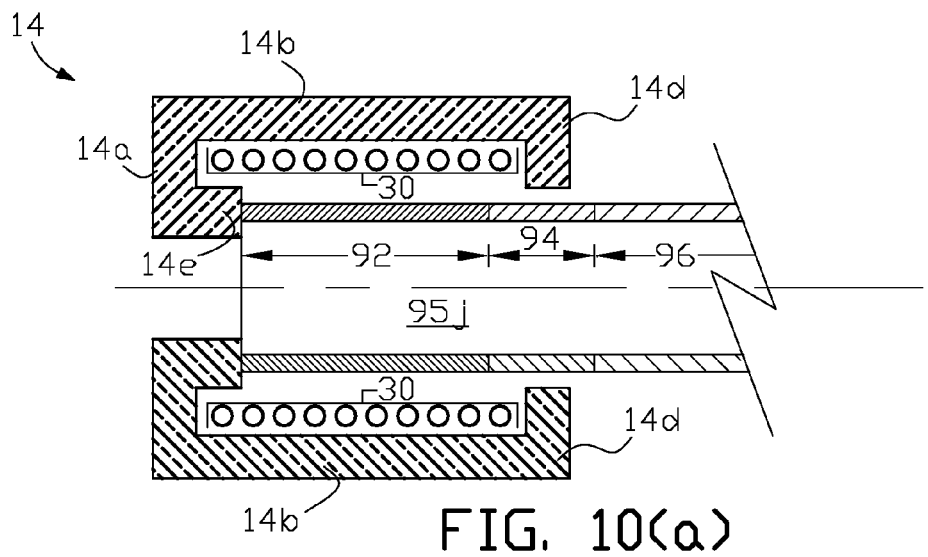
FIG. 10(a), FIG. 10(b) and FIG. 10(c) illustrate in cross sectional diagrams another example of the electric induction heat treatment of an end of a tubular material of the present invention.
Figure 10B:
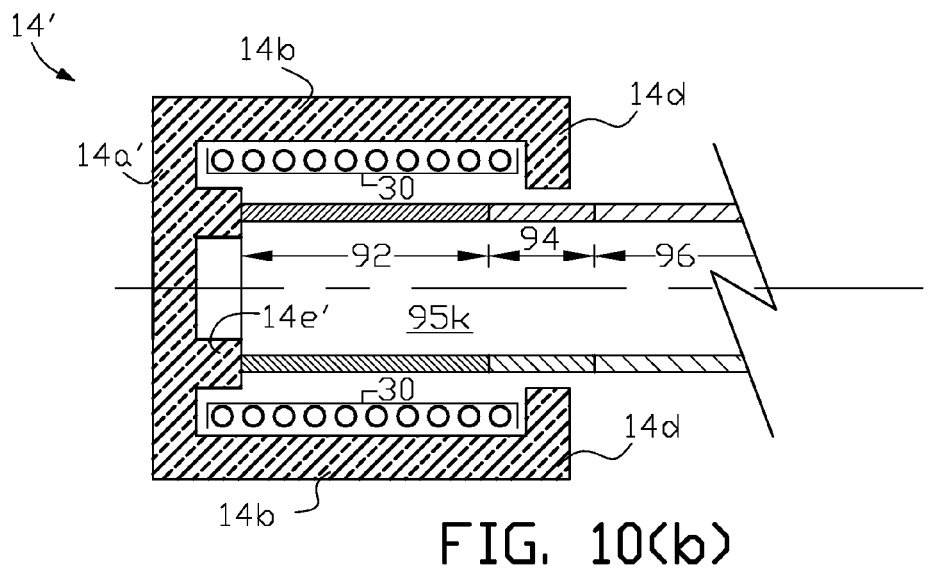
Figure 10C:
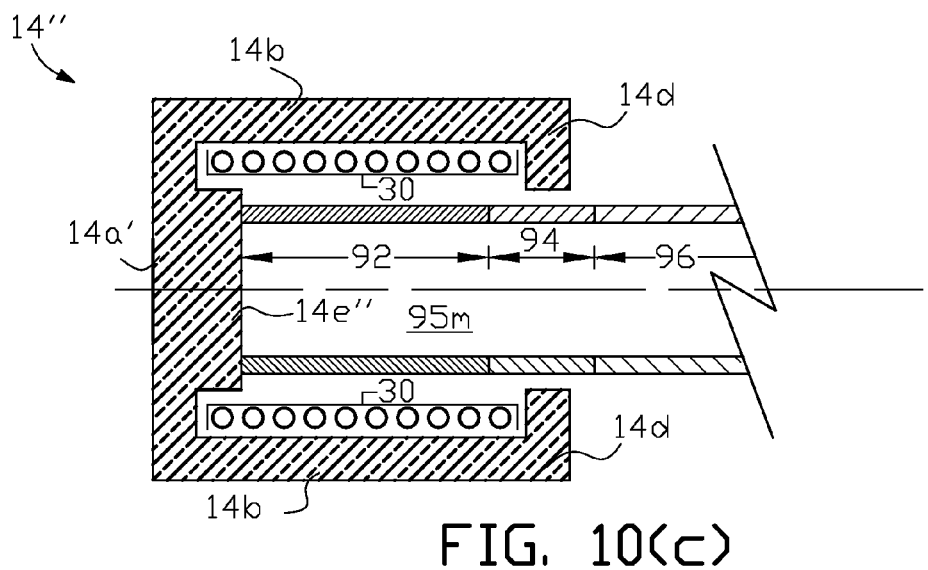

FIG. 10(a), FIG. 10(b) and FIG. 10(c) illustrate examples of the present invention that are particularly suited for use with high resistivity tubular material (for example, graphite or electrically conductive ceramic compositions). In the example of FIG. 10(a), a central pole element is not used. Concentrator 14 comprises base element 14a, and a plurality of peripheral poles 14b, each of which has an optional leg element 14d located adjacent to its extended end. Base element 14a is an annulus in this non-limiting example of the invention and has annular offset element 14e extending around its opening on the tube-facing side of the base element to extend the base element into the overhang region. All elements of concentrator 14 are fixed in position, along with solenoidal coil 30 and tubular material 95j, during the heating process. The end of tubular material 95j is flush with the facing surface of annular offset element 14e. The arrangement shown in FIG. 10(b) is similar to the arrangement in FIG. 10(a) except that base element 14a' of concentrator 14' is a solid cylindrical disk. The arrangement shown in FIG. 10(c) is similar to the arrangement shown in FIG. 10(b) except that offset element 14e" of concentrator 14" is a solid cylindrical disk.

Figure 11A:
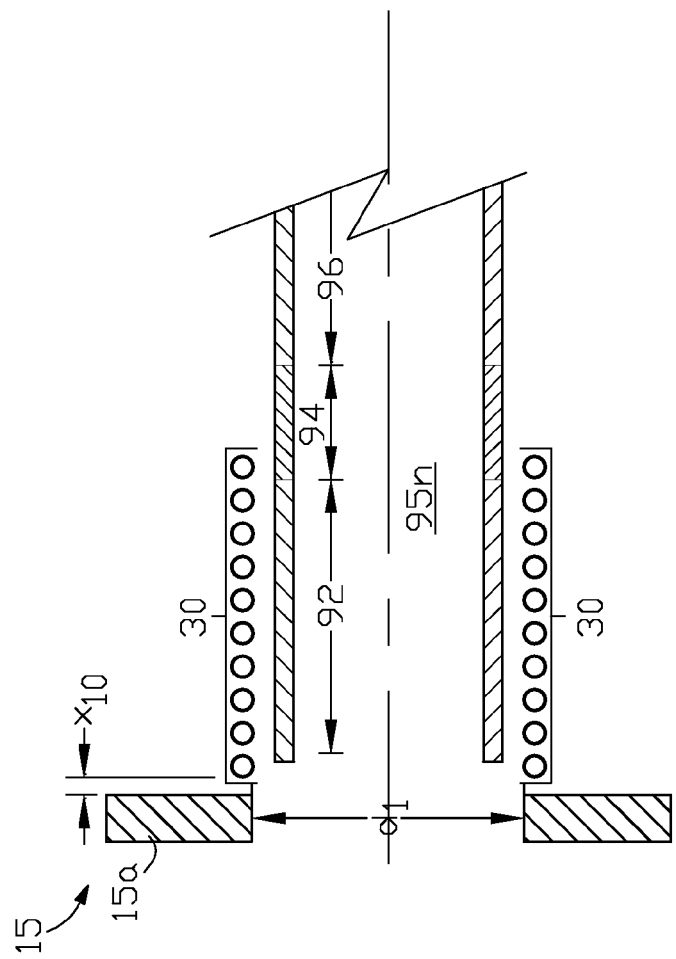
FIG. 11(a) illustrates in cross sectional diagram another example of the electric induction heat treatment of an end of a tubular material of the present invention.
Figure 11B:
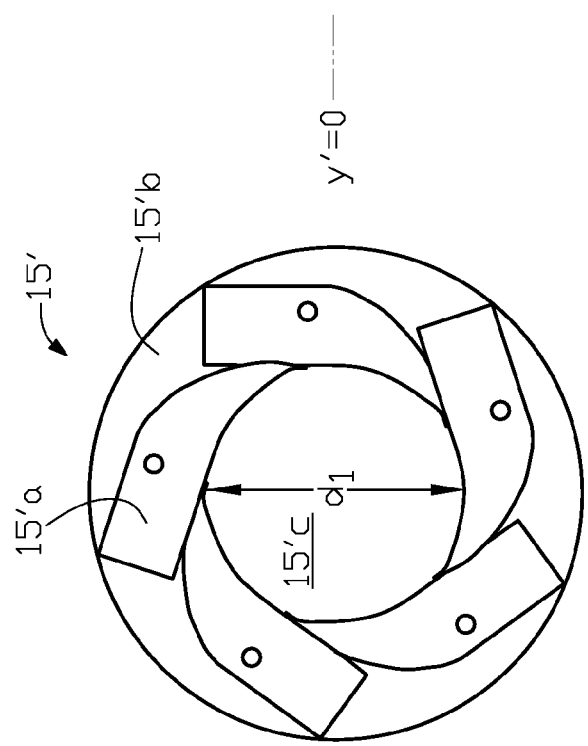
FIG. 11(b) is an end elevational view of one example of an adjustable iris diaphragm used with some examples of the electric induction heat treatment of an end of a tubular material of the present invention.

FIG. 11(a) and FIG. 11(b) illustrate examples of the present invention particularly suitable for use with low resistivity tubular material. In these examples, the end of tube flux concentrator comprises fixed annulus 15, as shown in FIG. 11(a), or adjustable iris diaphragm 15', as shown in FIG. 11(b), which effectively functions as an annulus with a variable opening to accommodate induction heating of tubular materials with different properties and physical characteristics. FIG. 11(b) shows a typical, but non-limiting, example of an adjustable iris diaphragm wherein blades 15'a are rotationally attached to mounting structure 15'b so that rotation of the blades results in increasing or decreasing the size of opening 15'c. The central axes of both annulus 15 and diaphragm 15' can be aligned with the central axis of either the induction coil or the tube within the induction coil. An overhang distance, as illustrated in FIG. 11(a), may be provided when either the annulus or diaphragm is used, or the end of the tube may be in contact with the surface of the annulus or diaphragm. The fixed radius of the annulus 15, or variable radius of diaphragm 15', can range from less than the inner diameter of the tubular material to the inner dimension (e.g. diameter) of the induction coil.

Figure 12:
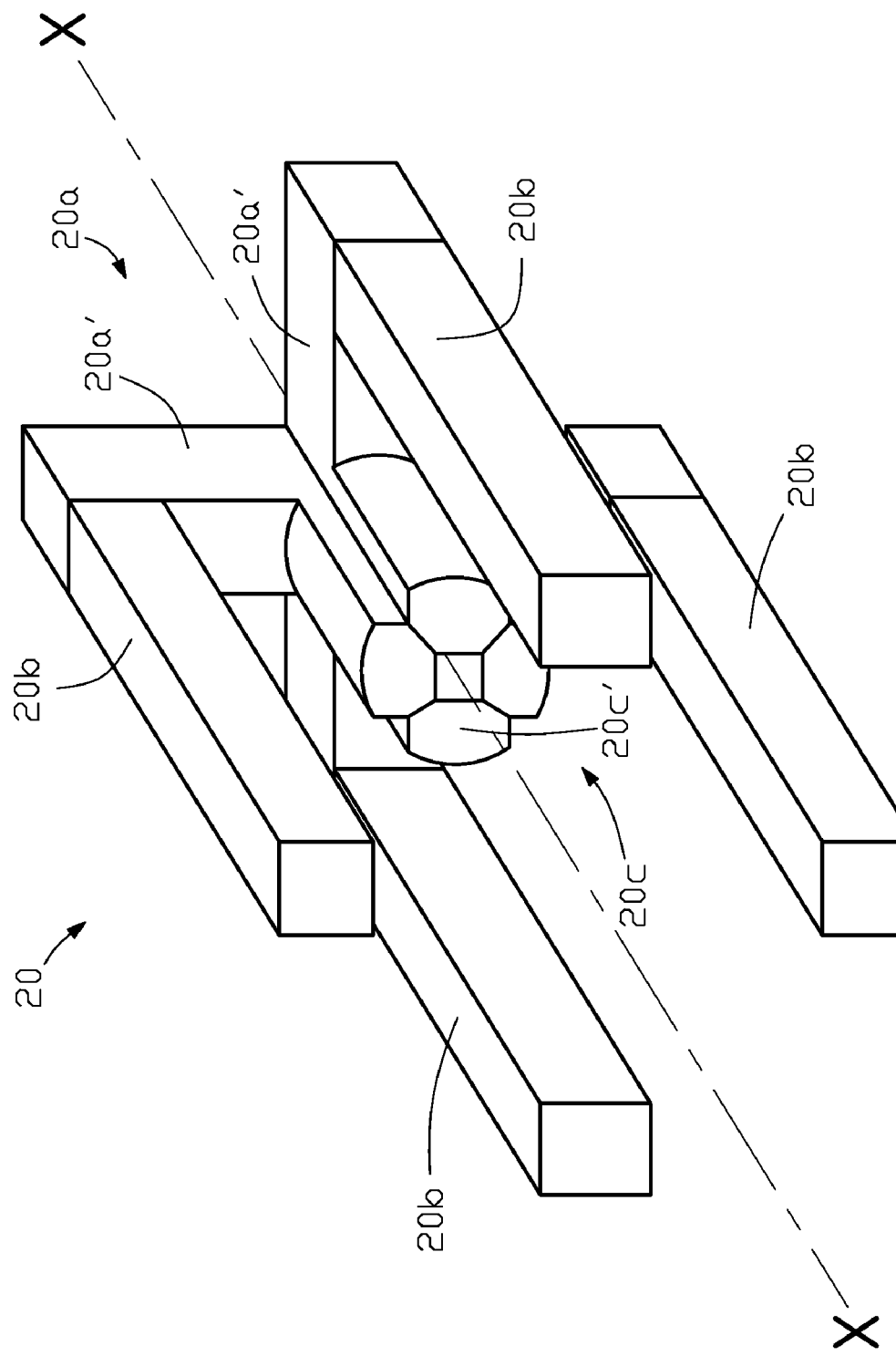
FIG. 12 is a perspective view of another magnetic flux concentrator used for electric induction heat treatment of an end of a tubular material of the present invention.
Figure 16C:
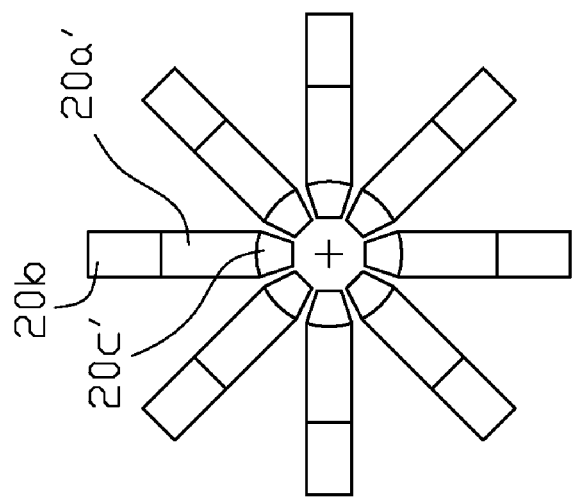
FIG. 16(a), FIG. 16(b) and FIG. 16(c) illustrate in an end elevational view alternative examples of the magnetic flux concentrator illustrated in FIG. 12 with varying number of peripheral poles.
Figure 16B:
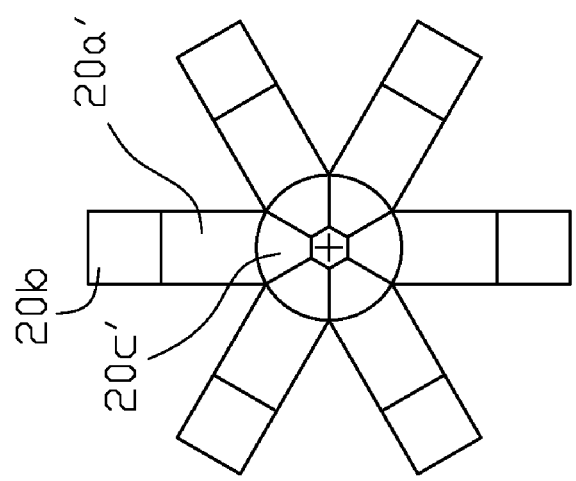
Figure 16A:
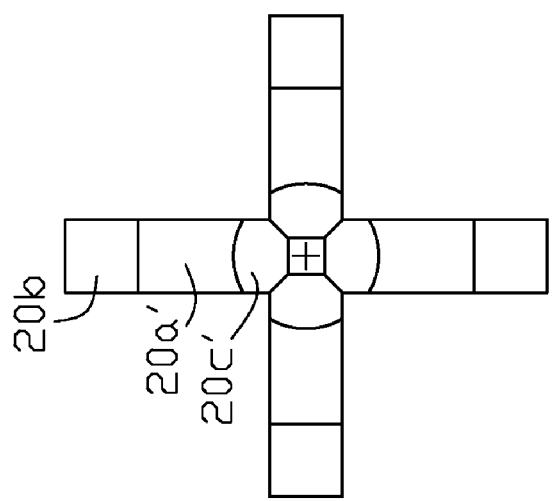

When a central pole element is used in other examples of the invention, the central pole element may comprise a plurality of structures that collectively form a central pole element to establish a particular flux path around the central axis of the tubular material. For example, in FIG. 12, magnetic flux concentrator 20 comprises base 20a, peripheral poles 20b and central pole 20c, wherein central pole 20c comprises four wedge elements 20c' arranged symmetrically around a central axis. Each wedge element 20c' has a base leg element 20a' extending substantially perpendicular from one end (referred to as the converging end) of the wedge element to collectively form base 20a. Peripheral pole 20b extends from the opposing end (referred to as the diverging end) of each edge element as shown in FIG. 12 and FIG. 16(a). In other examples of the invention the number of peripheral poles may be increased, for example, to four or six, as shown in FIG. 16(b) and FIG. 16(c), respectively, or any other number of poles.

Figure 13A:
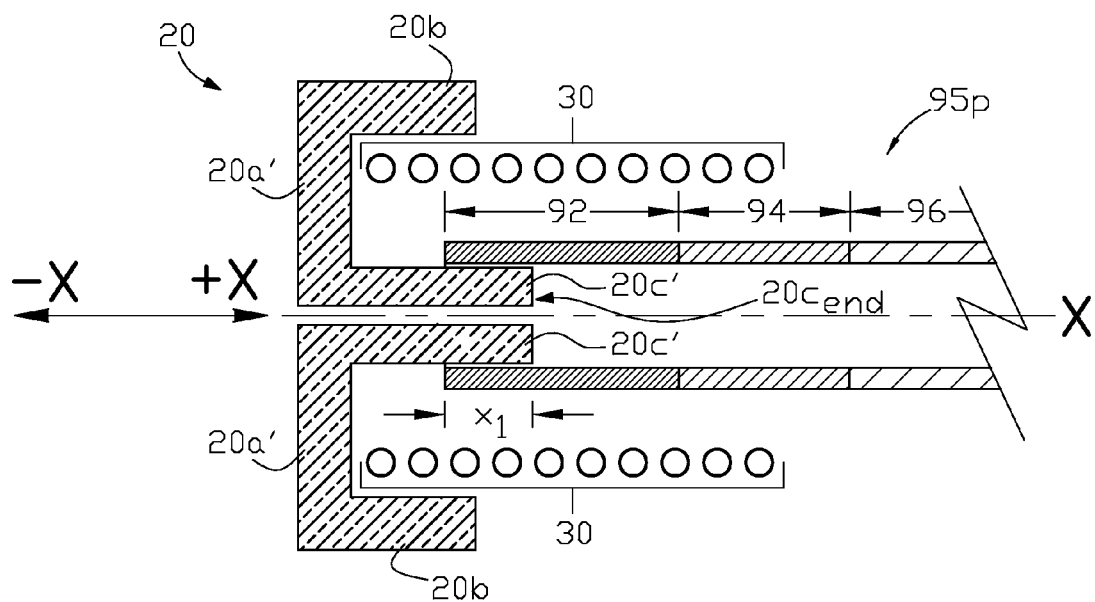
FIG. 13(a) and FIG. 13(b) illustrate in cross sectional diagrams another example of the electric induction heat treatment of an end of a tubular material of the present invention.
Figure 13B:
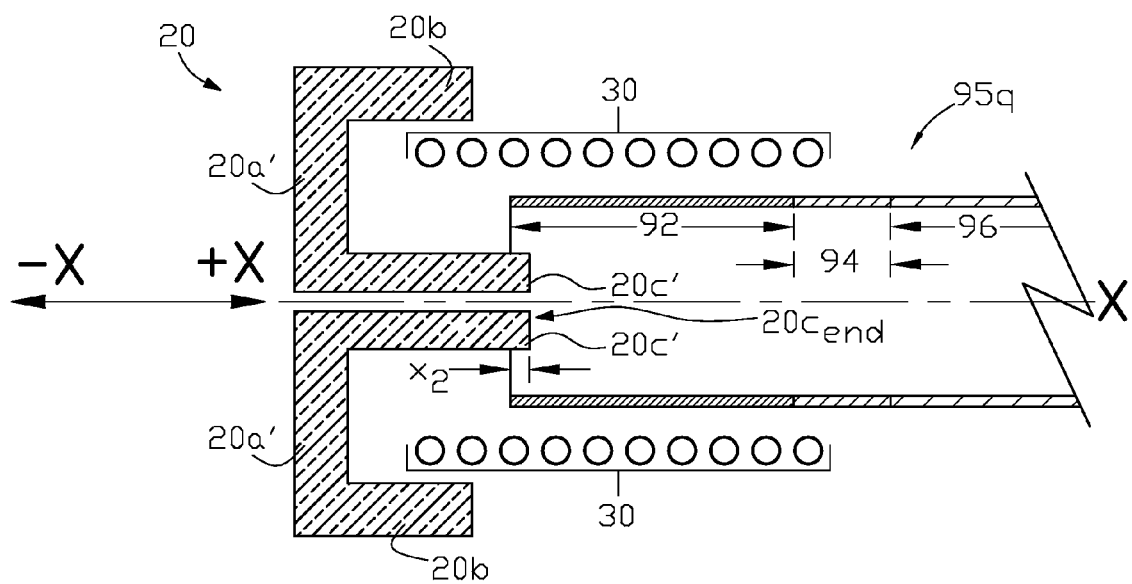

FIG. 13(a) and FIG. 13(b) illustrate examples of concentrator 20 wherein two peripheral poles 20b are used. The arrangement and configuration is similar to that in FIG. 4(a) and FIG. 4(b), respectively, except that in FIG. 4(a) and FIG. 4(b) a cylindrical base 10a and central pole 10c are used. In FIG. 13(a) the end of central pole 20c (comprising two wedge elements 20c') is positioned about the X-axis in the interior opening of the tubular element 95p for a distance $x_1$ to achieve required end heated length 92; whereas in FIG. 13(b) central pole 20c of concentrator 20 is positioned along the X-axis into the interior opening of tubular element 95q for a distance $x_2$ to achieve required end heated length 92. Depending upon specific requirements of an application, the distance $x_2$ could be negative; that is, end $20c_{end}$ of the central pole 20c can be located at a certain distance outside of the tube in the coil overhang region.

Figure 14A:
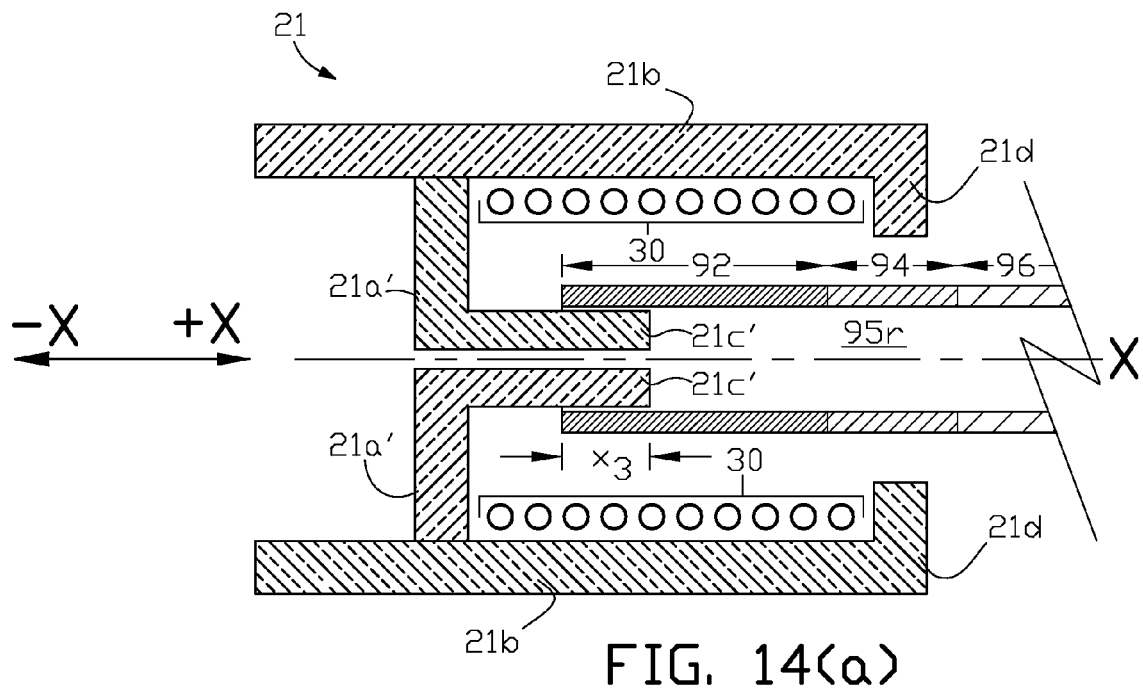
FIG. 14(a) and FIG. 14(b) illustrate in cross sectional diagrams another example of the electric induction heat treatment of an end of a tubular material of the present invention.
Figure 14B:
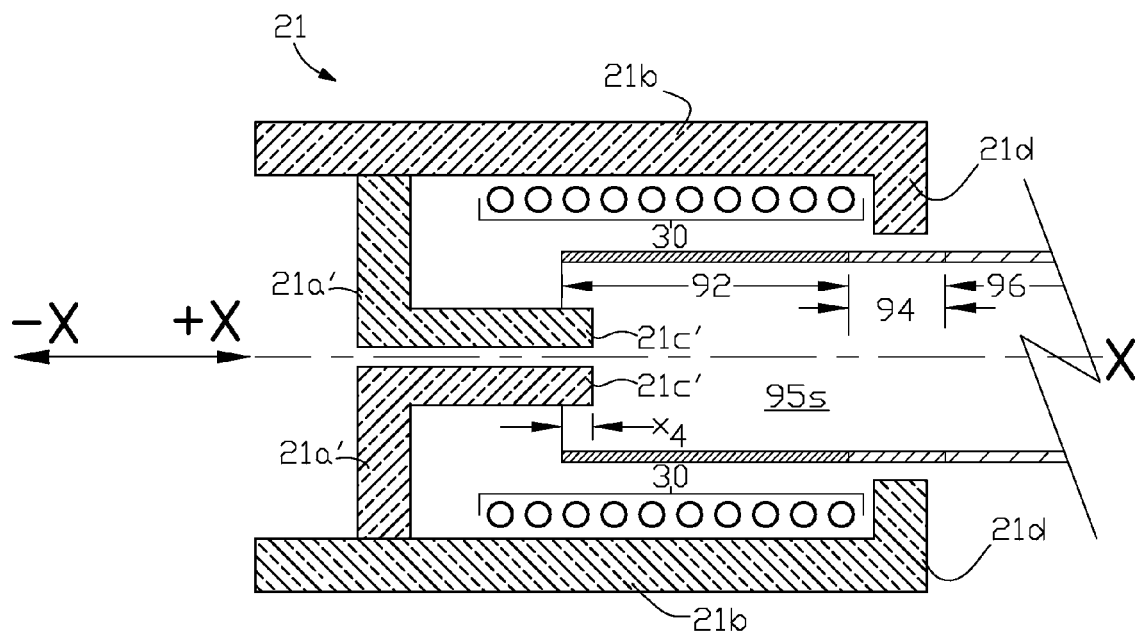

FIG. 14(a) and FIG. 14(b) illustrate examples of concentrator 21 wherein peripheral poles 21b and optional leg elements 21d are fixed, while base element 21a (comprising two base leg elements 21a') and the central pole 21c (comprising two wedge elements 21c') can be moved in the +X and −X directions. The arrangement and configuration is similar to that in FIG. 5(a) and FIG. 5(b), respectively, except that in FIG. 5(a) and FIG. 5(b) a cylindrical base 11a and central pole 11c are used, and only the central pole is moveable. As illustrated in FIG. 14(a), the end of central pole 21c is positioned along the X-axis into the interior opening of tubular element 95r for a distance of $X_3$ to achieve required end heated length 92; whereas in FIG. 14(b), central pole 21c of concentrator 21 is positioned along the X-axis into the interior opening of tubular element 95s for a distance $X_4$ to achieve required end heated length 92.

Figure 15A:
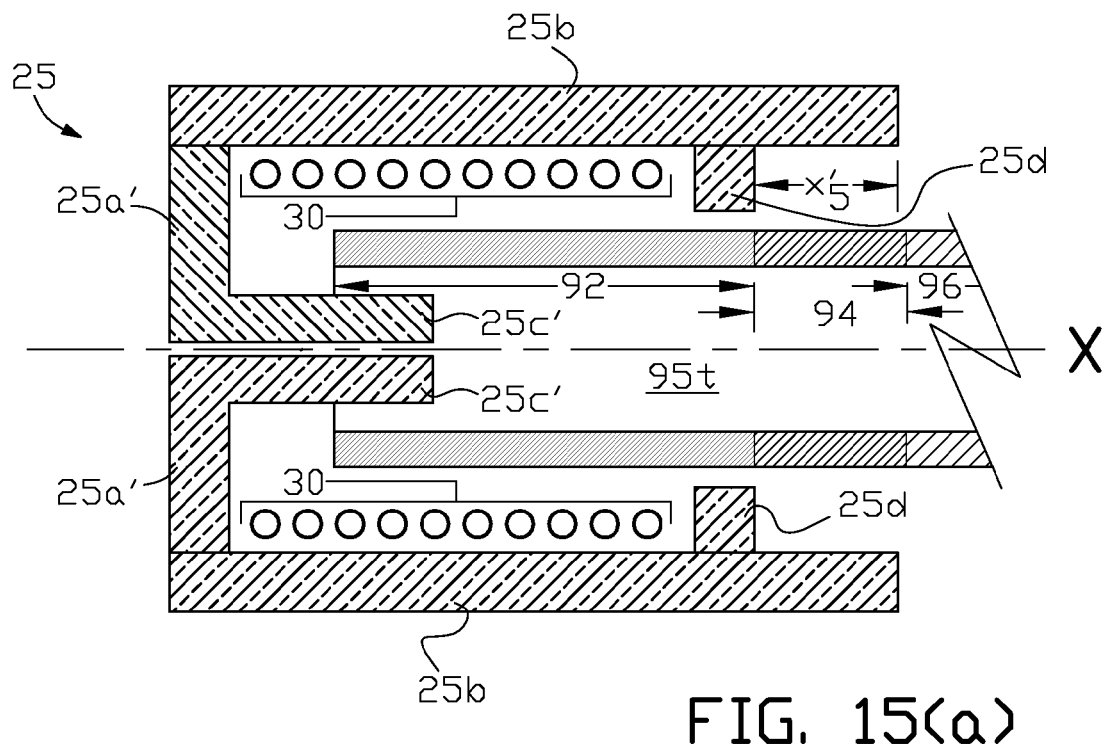
FIG. 15(a) and FIG. 15(b) illustrate in cross sectional diagrams another example of the electric induction heat treatment of an end of a tubular material of the present invention.
Figure 15B:
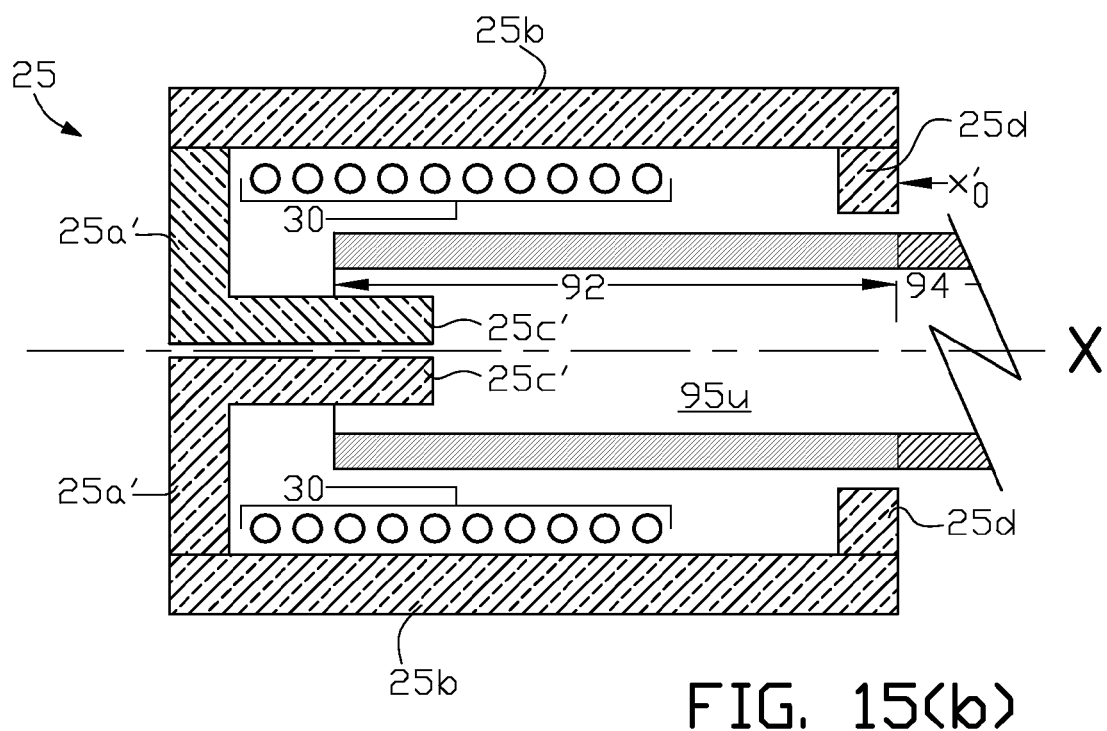

FIG. 15(a) and FIG. 15(b) illustrate examples of concentrator 25 wherein peripheral poles 25b are fixed while leg elements 25d are moveable in a direction generally parallel to the length of its adjacent peripheral pole. The arrangement and configuration is similar to that in FIG. 6(a) and FIG. 6(b), respectively, except that in FIG. 6(a) and FIG. 6(b) a cylindrical base 11a and central pole 11c are used. As illustrated in FIG. 15(a), leg element 25d is positioned along peripheral pole element 25b at a distance of $x'_5$ from the extend end of the peripheral pole element to achieve required end heated length 92; whereas in FIG. 15(b), leg element 25d is positioned at x'$_0$, which is defined as the location of the extended end of the peripheral pole element. In other examples of the invention, a combination of movement of leg elements 25d, and base element 25a (comprising two base leg elements 25a') and the central pole 25c (comprising two wedge elements 25c'), as described above, may be used.

Figure 17A:
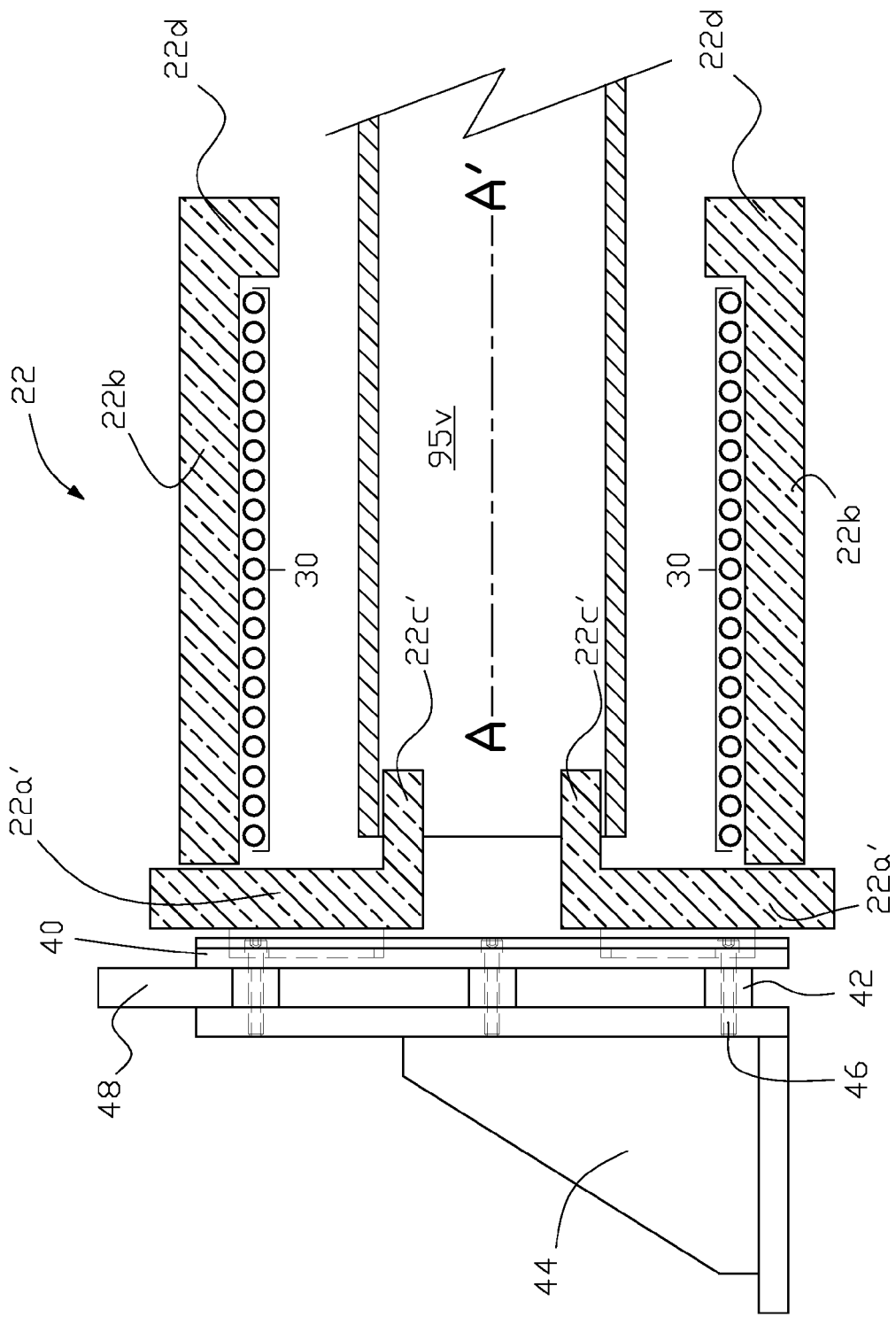
FIG. 17(a), FIG. 17(b) and FIG. 17(c) illustrate another example of the electric induction heat treatment of an end of a tubular material of the present invention wherein the magnetic flux concentrator has elements radially adjustable along the central axis of the tubular material.
Figure 17C:
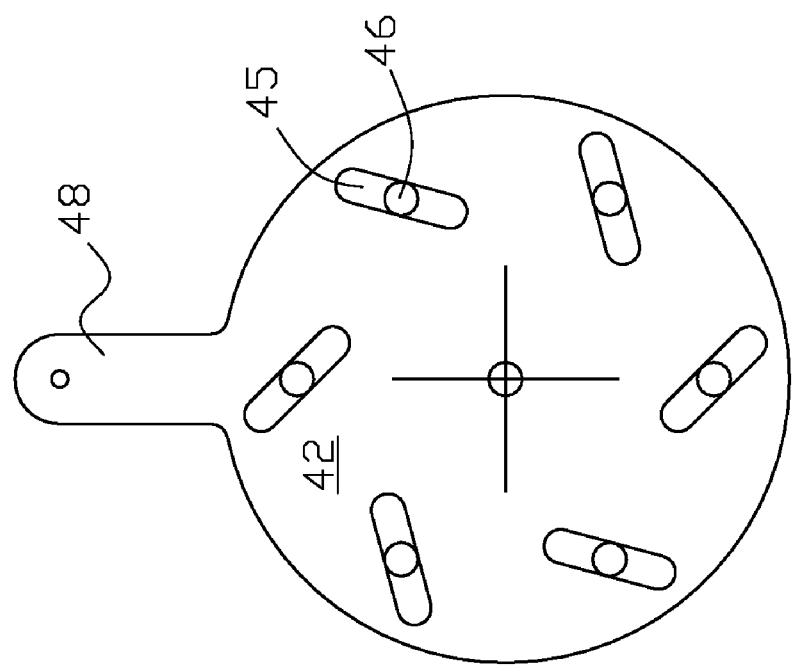
Figure 17B:
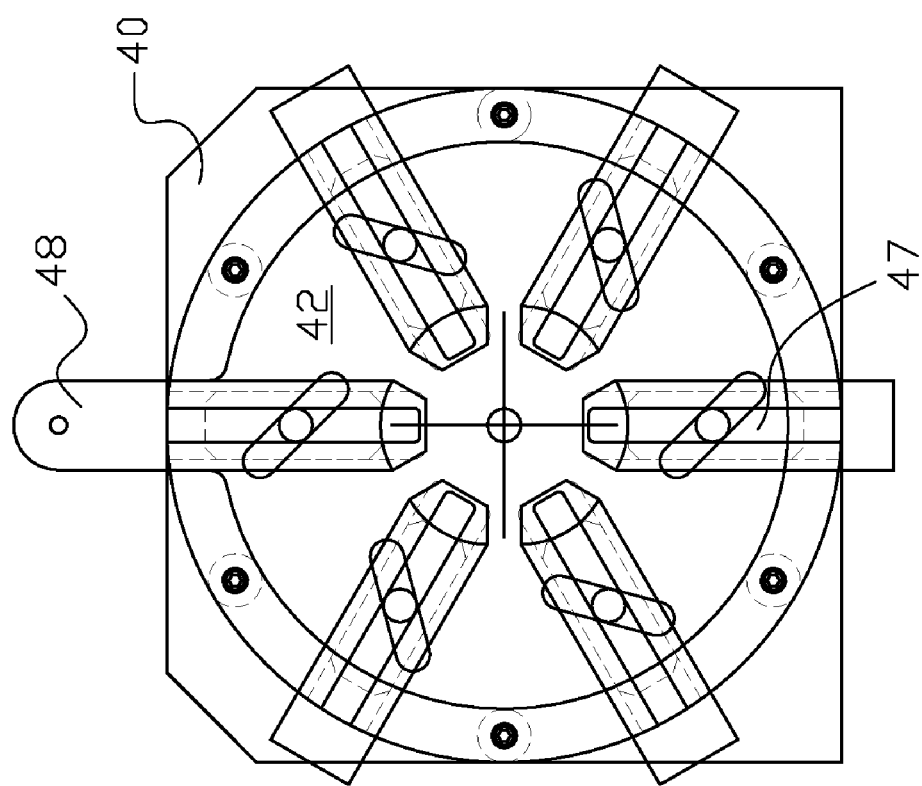
Figure 18A:
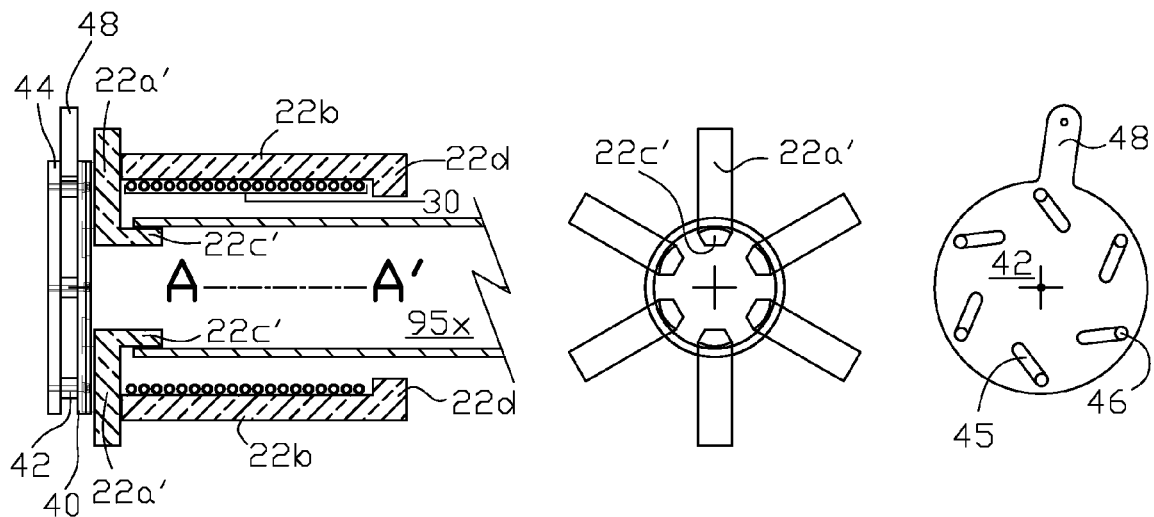
FIG. 18(a), FIG. 18(b) and FIG. 18(c) illustrate repositioning of the adjustable elements of the magnetic flux concentrator illustrated in FIG. 17(a), FIG. 17(b) and FIG. 17(c).
Figure 18B:
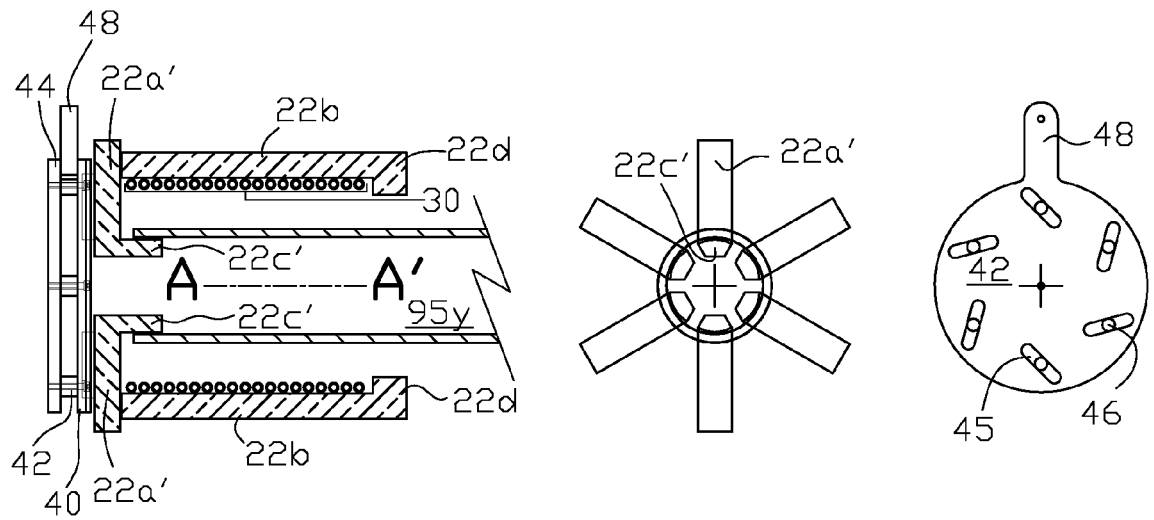
Figure 18C:
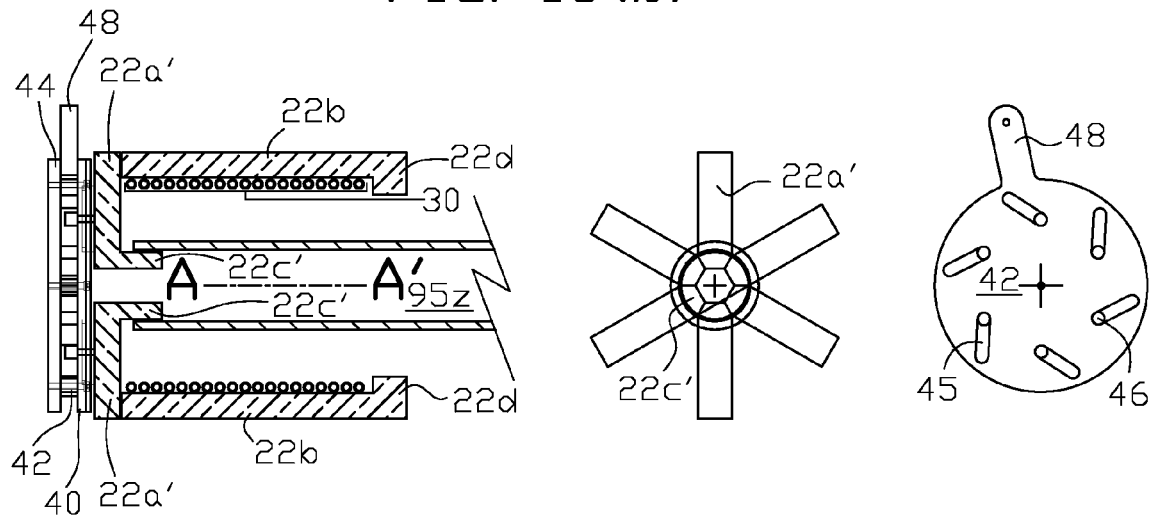

In other examples of the invention, radial movement of selected components of the magnetic flux concentrator about the central axis of the tubular material can be accomplished, with or without movement of one or more of the concentrator's components along the X-axis. Suitable mechanical elements may be used to provide the radial movement. By way of example and not limitation, FIG. 17(a), FIG. 17(b) and FIG. 17(c) illustrate one example of the present invention wherein selected components of the magnetic flux concentrator are moved radially about the central (longitudinal) axis of the tubular material. Such movement may be useful in accommodating tubular material of different diameters as further described below. Referring to these figures, the exemplary magnetic flux concentrator 22 is similar to concentrator 20 illustrated in FIG. 13(a) and FIG. 13(b) except for the following changes. There are six peripheral poles 22b that are located around induction coil 30, along with optional leg elements 22d. Each base leg element 22a' and wedge element 22c' are radially moveable about central axis A-A' of the tubular material. The six base leg elements are attached to structural support element 44 via cam pins 46 through slots in cam follower 40 and cam plate 42 (47 and 45 respectively). Cam plate 42 is free to rotate between structural support element 44 and cam follower 40 whereby cam pins 46 slide each base leg element 22a' and wedge element 22c' either towards or away from the central axis. FIG. 18(a), FIG. 18(b) and FIG. 18(c) illustrate the effect of rotating cam shaft 42 by actuator arm 48 in the counter-clockwise direction progressing from FIG. 18(a) to FIG. 18(c). As the tubular material decreases in diameter from tube 95x in FIG. 18(a) to tube 95z in FIG. 18(c), wedge elements 22c' and base leg elements 22a' move radially towards the central axis so that the wedge elements can still be inserted within the interior of the tubular material with minimal radial gap as the inside diameter of the tubular material decreases.

Figure 19:
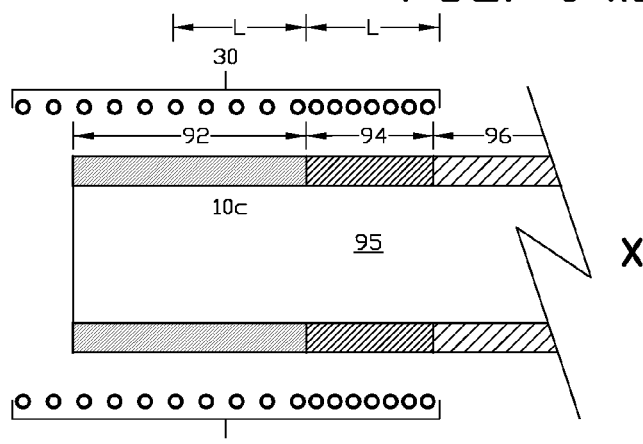
FIG. 19 illustrates one example of the electric induction heat treatment of an end of a tubular material of the present invention wherein an induction coil with variable turns ratio is used.

Any the flux concentrators of the present invention may be combined with a variable winding induction coil wherein the induction coil has a tighter turn ratio (number of turns per unit length, L) around the thermal transition zone 94 than in the end heated length 92 as illustrated in FIG. 19.

Features of the magnetic flux concentrator of the present invention illustrated in separate example of the invention may be combined in other examples of the invention. In all examples of the invention, the magnetic flux concentrator may be formed from any suitable material that is magnetically conductive (high permeability) and has relatively high electrical resistivity (low power loss). In form the magnetic flux concentrator may be a laminated stack of magnetic material, ferrite, iron-based and ferrite-based powder materials, and may be cast or assembled in parts.

In all examples of the invention, the term "tubular material" includes pipes and tubes, but also includes any material having a longitudinal (central) axis and an interior opening. For example, the tubular material may be rectangular in cross section and have a corresponding rectangular interior opening; in this example of the invention the central pole may be rectangular in shape for insertion into the rectangular opening in the tubular material.

In all examples of the invention movement of the magnetic flux concentrator may be accomplished by any method, including but not limited to, movement by a human operator, or a linear drive means, such as an electric or hydraulic drive. Further movement may be manually or automatically accomplished in some examples of the invention. For example sensors may sense the dimensions of the tubular material to be presently heat treated, and output a signal to a processor which executes a program for appropriately moving the position of the concentrator. Sensors may be proximity sensors, sensing for example, the position of the exterior and/or interior of the tubular material to be heat treated. In other examples of the invention a human operator may input data to a processor via a suitable input device, such as a keyboard, to identify the tubular material to be heat treated, and the flux concentrator would move according to a stored position value. In other examples of the invention sensors may be used to sense in real time point end heating temperatures, for examples, by pyrometers, infrared sensors or other thermal imaging sensors, to sense real time point end heating, to adaptively adjust the radial and axial position of concentrator. This alternative would account for metallurgical anomalies in a particular size of tubular material and adjust the position of concentrator accordingly.

A single layer, multi-turn coil is shown in the above examples of the invention. However the invention is not limited to a particular type of coil design. For example a single turn coil, multiple layers of coils, or multiple coils connected to a plurality of power sources may be used with the apparatus of the present invention.

Depending on the application and process requirements, different designs of flux concentrators may be used. For example lamination stacks may be a continuous circular element, or can be fabricated from multiple stacks. Depending upon application and specifics of process requirements: a "C"-shaped (base element and two peripheral poles with no central pole); a double "C"-shaped (base element and four peripheral poles with no central pole); a "T"-shaped (base element and central pole with no peripheral poles); or an "I"-shaped lamination or powder formed flux concentrator, or any combination of the above shapes, may be used instead of an "E"-shaped concentrator.

While the above examples of the invention describe keeping the position of the solenoidal coil constant, in other examples of the invention a combination of the movement of the solenoidal coil and end magnetic flux concentrator described in any of the above examples of the invention may be used without deviating from the scope of the invention. In other examples of the invention any of the concentrators and/or tubular material in the above examples of the invention may be rotated during the induction heat treatment process.

The term "solenoidal induction coil" as used in the invention is understood in its broadest sense as any combination of one or more induction coils in which a magnetic field is generated when an ac current flows through the one or more induction coils, and the magnetic field couples with the end of a tubular material inserted into the one or more induction coil. The invention is not limited to a particular geometric configuration of a induction coil.

In all examples of the invention, both ends of a tubular material can be induction heated at the same time by inserting the entire length of the tubular material into a solenoidal induction coil so that an overhang distance is established at both ends of the tubular material.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, The invention is not intended to be limited to the particulars disclosed herein; rather, the invention extends to all functionally equivalent structures, methods and uses. Those skilled in the art, having the benefit of the teachings of this specification and the appended claims, may affect numerous modifications thereto, and changes may be made without departing from the scope of the invention in its aspects. The invention is not limited to what is described above but also includes the invention as recited in the attached claims.

The invention claimed is:

1. A method of electric induction heat treatment of at least one end region of a tubular material, the method comprising the steps of inserting the at least one end region of the tubular material into an induction coil to an overhang distance from an end of the induction coil and applying ac power to the induction coil, the improvement comprising, locating a flux concentrator in the vicinity of the at least one end region of the tubular material in the induction coil so that an at least one central pole of the flux concentrator extends generally from the central region of a surface of a base of the flux concentrator at least partially into the overhang distance, and a plurality of peripheral poles, radially distributed around the perimeter of the base, generally extend around the exterior of the end of the induction coil for a distance equal to at least a portion of the overhang distance, each of the plurality of peripheral poles terminating in an extended end.

2. The method of claim 1 further comprising the step of moving the flux concentrator generally along the longitudinal axis of the flux concentrator to adjust the position of the flux concentrator relative to the positions of the at least one end region of the tubular material and the induction coil.

3. The method of claim 2 further comprising the steps of holding the positions of the base and the plurality of peripheral poles constant and moving the at least one central pole along the longitudinal axis of the flux concentrator to adjust the position of the at least one central pole relative to the positions of the base and the plurality of peripheral poles.

4. The method of claim 1 further comprising the steps of locating a flux concentrator leg adjacent to the extended end of at least one of the plurality of peripheral poles and facing the flux concentrator leg towards the exterior of the tubular material.

5. The method of claim 4 further comprising the step of moving the flux concentrator leg substantially parallel to the length of the at least one of the plurality of peripheral poles.

6. The method of claim 1 wherein the base comprises a plurality of base legs radially distributed around the longitudinal axis of the flux concentrator, the at least one central pole comprises a plurality of wedges, each of the plurality of wedges extending generally perpendicularly from the tube-facing side of the converging end of one of the plurality of base legs, and each of the plurality of peripheral poles extending generally perpendicularly from the tube-facing side of the diverging end of each of the plurality of base legs.

7. The method of claim 6 further comprising the step of moving the flux concentrator generally along the longitudinal axis of the flux concentrator to adjust the position of the flux concentrator relative to the fixed positions of the at least one end region of the tubular material and the induction coil.

8. The method of claim 6 further comprising the steps of holding the positions of the plurality of peripheral poles constant, and moving the at least one central pole and base along the longitudinal axis of the flux concentrator to adjust the positions of the at least one central pole and base to the fixed positions of the at least one end region of the tubular material and the induction coil.

9. The method of claim 6 further comprising the steps of locating a flux concentrator leg adjacent to the extended end of at least one of the peripheral poles and facing the flux concentrator leg towards the exterior of the tubular material.

10. The method of claim 9 further comprising the step of moving the flux concentrator leg substantially parallel to the length of the at least one of the peripheral pole elements.

11. The method of claim 6 further comprising the step of moving the plurality of base legs and wedges in a direction substantially perpendicular to the longitudinal axis of the flux concentrator.

12. A method of electric induction heat treatment of at least one end region of a tubular material, the method comprising the steps:

inserting the at least one end region of the tubular material into an induction coil;

locating the surface of a base of a flux concentrator adjacent to an end of the induction coil;

extending each of a plurality of peripheral poles from the periphery of the base around the exterior of the end of the induction coil to an extended end at a distance equal to at least the end of the tubular material inserted into the induction coil; and applying ac power to the induction coil.

13. The method of claim 12 further comprising the steps of locating a flux concentrator leg adjacent to the extended end of at least one of the plurality of peripheral poles and facing the flux concentrator leg towards the exterior of the tubular material.

14. The method of claim 13 further comprising the step of moving the flux concentrator leg substantially parallel to the length of the at least one of the peripheral pole elements.

15. The method of claim 12 further comprising the steps of forming the base as an annulus or an adjustable iris diaphragm, and aligning the center of the annulus or diaphragm with the longitudinal axis of the tubular material.

16. The method of claim 12 further comprising the step of locating the end of the tubular material in the induction coil in contact with the tube-facing surface of the base.

17. The method of claim 12 further comprising the step of locating a base offset element having opposing surfaces in contact with the tube-facing surface of the base and the end of the tubular material.

18. A method of electric induction heat treatment of at least one end region of a tubular material, the method comprising the steps of:

inserting the at least one end region of the tubular material into an induction coil;

locating an annulus flux concentrator adjacent to an end of the induction coil, the central axis of the annulus coincident with the longitudinal axis of the tubular material and having an opening diameter ranging from less than the inner diameter of the tubular material to the inner diameter of the induction coil; and applying ac power to the induction coil.

19. The method of claim 18 wherein the annulus is formed from an adjustable iris diaphragm having a variable opening diameter ranging from less than the inner diameter of the tubular material to the inner diameter of the induction coil.

* * * * *